(12) United States Patent
Shimodaira et al.

(10) Patent No.: US 11,663,532 B2
(45) Date of Patent: May 30, 2023

(54) SHARED VEHICLE MANAGEMENT METHOD AND SHARED VEHICLE MANAGEMENT DEVICE

(71) Applicant: Nissan Motor Co., Ltd., Kanagawa (JP)

(72) Inventors: Seiji Shimodaira, Kanagawa (JP); Hiroya Fujimoto, Kanagawa (JP); Yasuhisa Kishi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 370 days.

(21) Appl. No.: 16/637,633

(22) PCT Filed: Aug. 8, 2017

(86) PCT No.: PCT/JP2017/028827
§ 371 (c)(1),
(2) Date: Feb. 7, 2020

(87) PCT Pub. No.: WO2019/030835
PCT Pub. Date: Feb. 14, 2019

(65) Prior Publication Data
US 2020/0272955 A1    Aug. 27, 2020

(51) Int. Cl.
*G06Q 10/047*    (2023.01)
*G01C 21/34*    (2006.01)
(Continued)

(52) U.S. Cl.
CPC ....... *G06Q 10/047* (2013.01); *G01C 21/3438* (2013.01); *G06Q 10/06315* (2013.01); *G06Q 50/30* (2013.01); *G08G 1/123* (2013.01)

(58) Field of Classification Search
CPC .......... G06Q 10/047; G06Q 10/06315; G06Q 50/30; G01C 21/343; G01C 21/3415;
(Continued)

(56) References Cited

U.S. PATENT DOCUMENTS 10,082,793 B1 *    9/2018    Glaser ............. G06Q 10/06314
10,475,143 B1 *    11/2019    Hayes .................... G01S 19/13
(Continued)

FOREIGN PATENT DOCUMENTS

CN    102147970 A    8/2011
CN    104464274 A    3/2015
(Continued)

*Primary Examiner* — Fadey S. Jabr
*Assistant Examiner* — Faris Asim Shaikh
(74) *Attorney, Agent, or Firm* — Osha Bergman Watanabe & Burton

(57) ABSTRACT

A vehicle management method includes calculating, based on a desired condition of each user sharing a ride on a vehicle, a first route for the vehicle to travel and a first required time for the vehicle to arrive at a destination on the first route, when a delay time with respect to the first required time exceeds a predetermined time while the vehicle is traveling along the first route, setting an alternative boarding location for a boarding location or an alternative deboarding location for a deboarding location based on the desired condition of each user, calculating a second route including the alternative boarding location or the alternative deboarding location and a second required time for the vehicle to arrive at a destination on the second route, and notifying the users of at least the alternative boarding location or the alternative deboarding location and the second required time.

8 Claims, 13 Drawing Sheets

(51) Int. Cl.
*G06Q 10/0631* (2023.01)
*G06Q 50/30* (2012.01)
*G08G 1/123* (2006.01)

(58) Field of Classification Search
CPC ............... G01C 21/34; G01C 21/3492; G01C 21/3605; G01C 21/3617; G01C 21/3611; G01C 21/3438; G01C 21/3691; H04W 4/02; H04W 4/40; H04W 4/024; G08G 1/123; G08G 1/205
See application file for complete search history.

(56) References Cited

U.S. PATENT DOCUMENTS

| | | | | |
|---|---|---|---|---|
| 10,677,602 | B2* | 6/2020 | Rakah | B60N 2/002 |
| 2011/0224893 | A1* | 9/2011 | Scofield | G08G 1/052 |
| | | | | 701/119 |
| 2016/0209220 | A1* | 7/2016 | Laetz | G06Q 10/047 |
| 2016/0349067 | A1* | 12/2016 | Fowe | G01C 21/343 |
| 2016/0364823 | A1* | 12/2016 | Cao | G01C 21/3438 |
| 2017/0286884 | A1* | 10/2017 | Shoval | G01C 21/3438 |
| 2018/0211124 | A1* | 7/2018 | Rakah | G06Q 10/047 |
| 2018/0338225 | A1* | 11/2018 | Shimizu | H04W 4/40 |
| 2019/0017839 | A1* | 1/2019 | Eyler | G01C 21/3638 |
| 2019/0258969 | A1* | 8/2019 | Akselrod | G06Q 10/025 |
| 2020/0149902 | A1* | 5/2020 | Fujimoto | G06Q 50/10 |
| 2021/0223051 | A1* | 7/2021 | Hochberg | G06Q 10/0631 |

FOREIGN PATENT DOCUMENTS

| | | |
|---|---|---|
| CN | 105677793 A | 6/2016 |
| CN | 105678412 A | 6/2016 |
| CN | 106157600 A | 11/2016 |
| JP | 2002-183892 A | 6/2002 |
| JP | 2005-182146 A | 7/2005 |
| JP | 2009-289192 A | 12/2009 |
| JP | 2014-146261 A | 8/2014 |
| JP | 2017-191371 A | 10/2017 |

\* cited by examiner

FIG. 3A
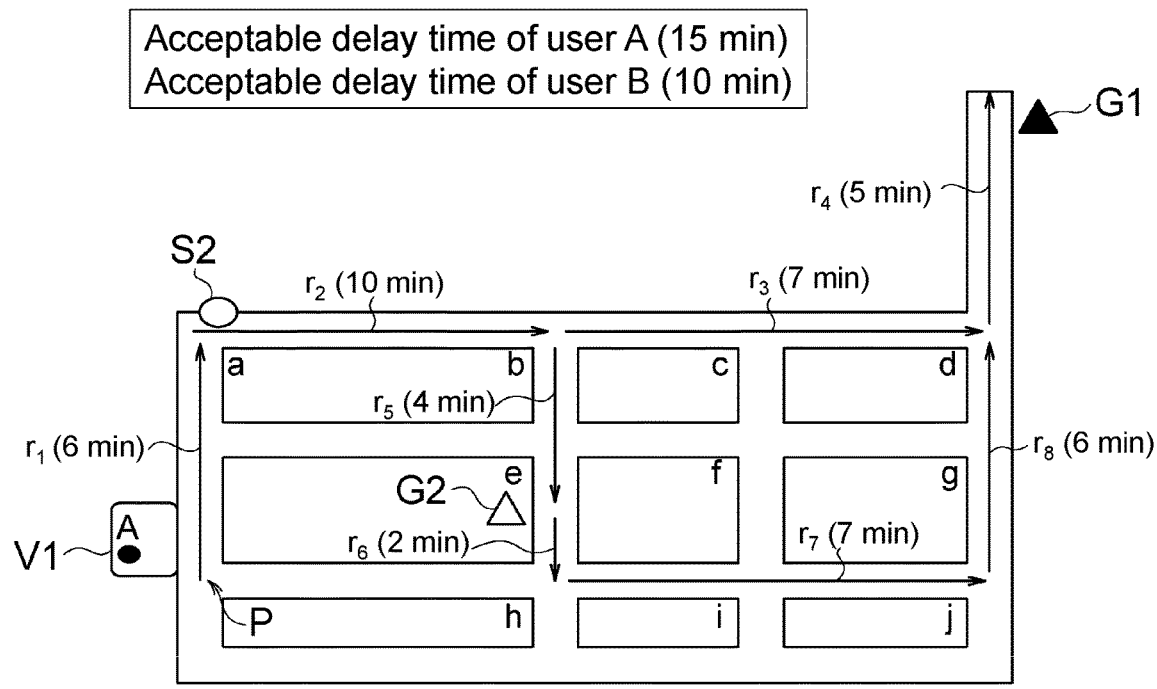
FIG. 3B
(i) Before use request reception from user B
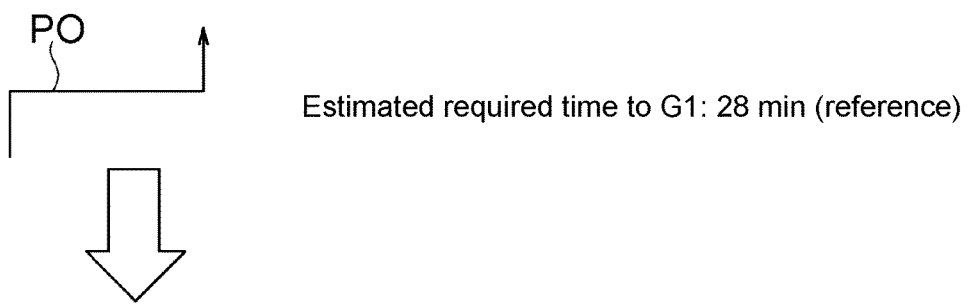
Estimated required time to G1: 28 min (reference)
(ii) After use request reception from user B
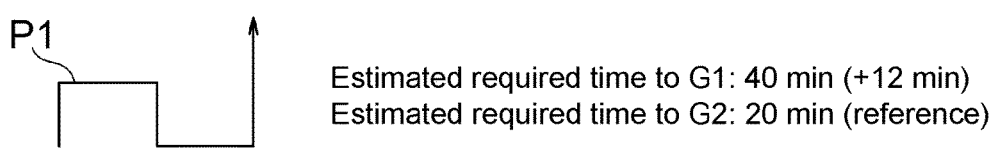
Estimated required time to G1: 40 min (+12 min)
Estimated required time to G2: 20 min (reference)

FIG. 4A
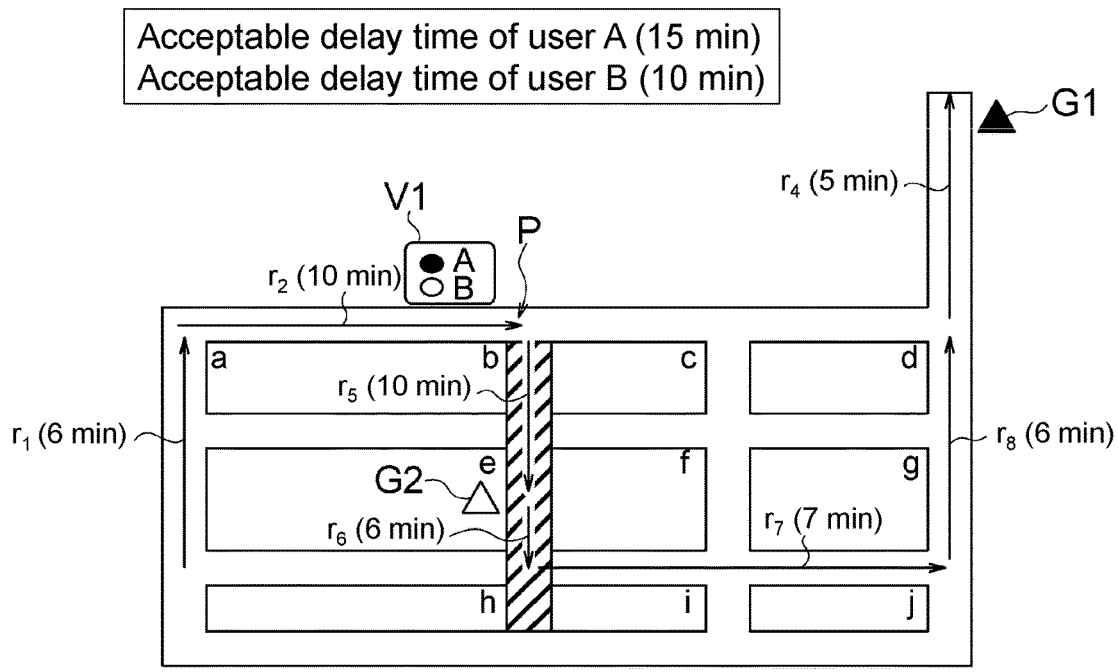
FIG. 4B
(i) Before use request reception from user B
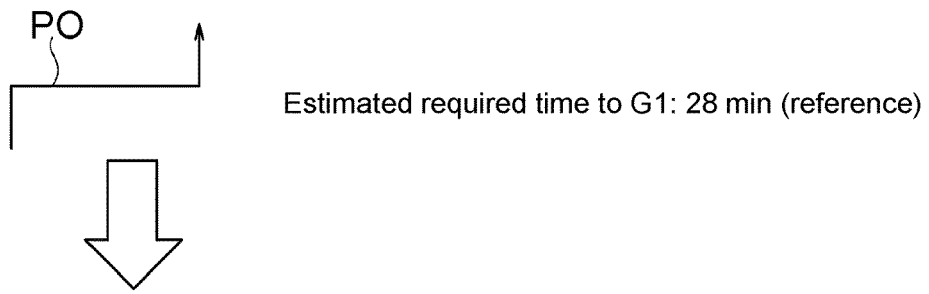
Estimated required time to G1: 28 min (reference)
(ii) After use request reception from user B
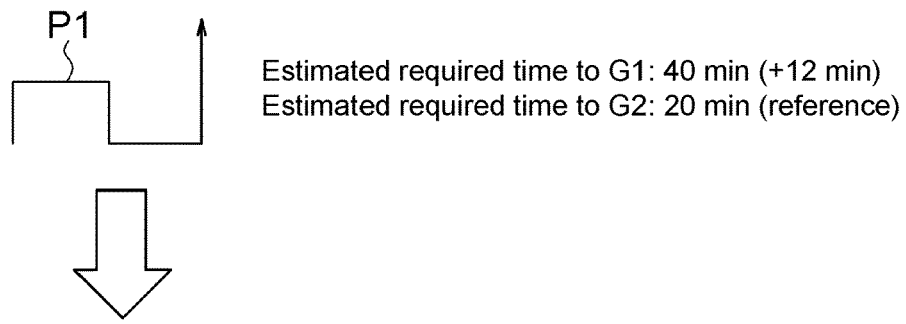
Estimated required time to G1: 40 min (+12 min)
Estimated required time to G2: 20 min (reference)
(iii) After occurrence of traffic congestion
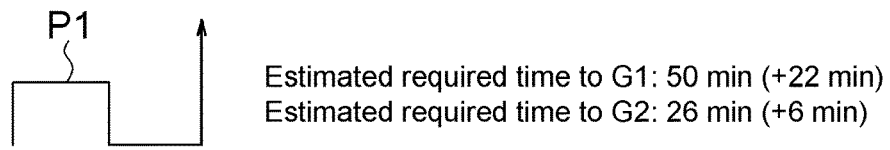
Estimated required time to G1: 50 min (+22 min)
Estimated required time to G2: 26 min (+6 min)

FIG. 5A

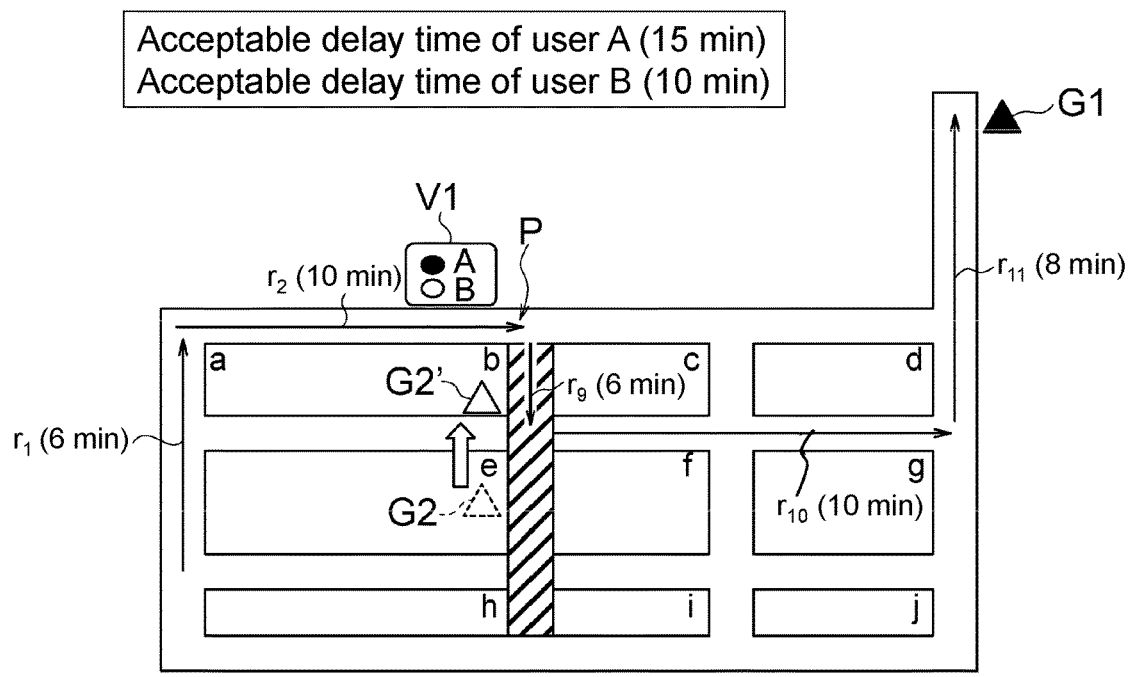

FIG. 5B (i). Before use request reception from user B

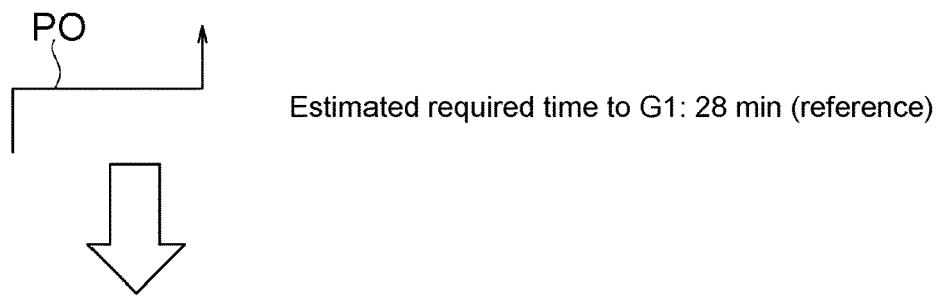

Estimated required time to G1: 28 min (reference)

(ii). After use request reception from user B

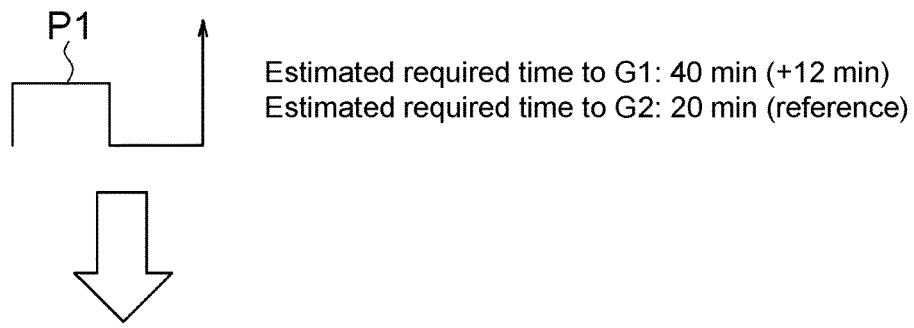

Estimated required time to G1: 40 min (+12 min)
Estimated required time to G2: 20 min (reference)

(iv) Alternative deboarding location is set after occurrence of traffic congestion

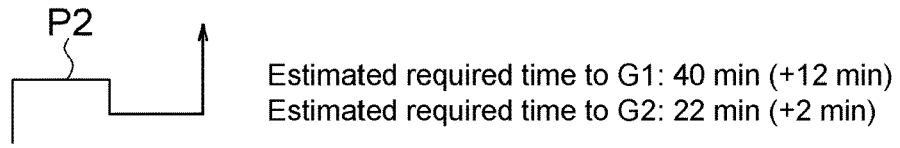

Estimated required time to G1: 40 min (+12 min)
Estimated required time to G2: 22 min (+2 min)

FIG. 7A

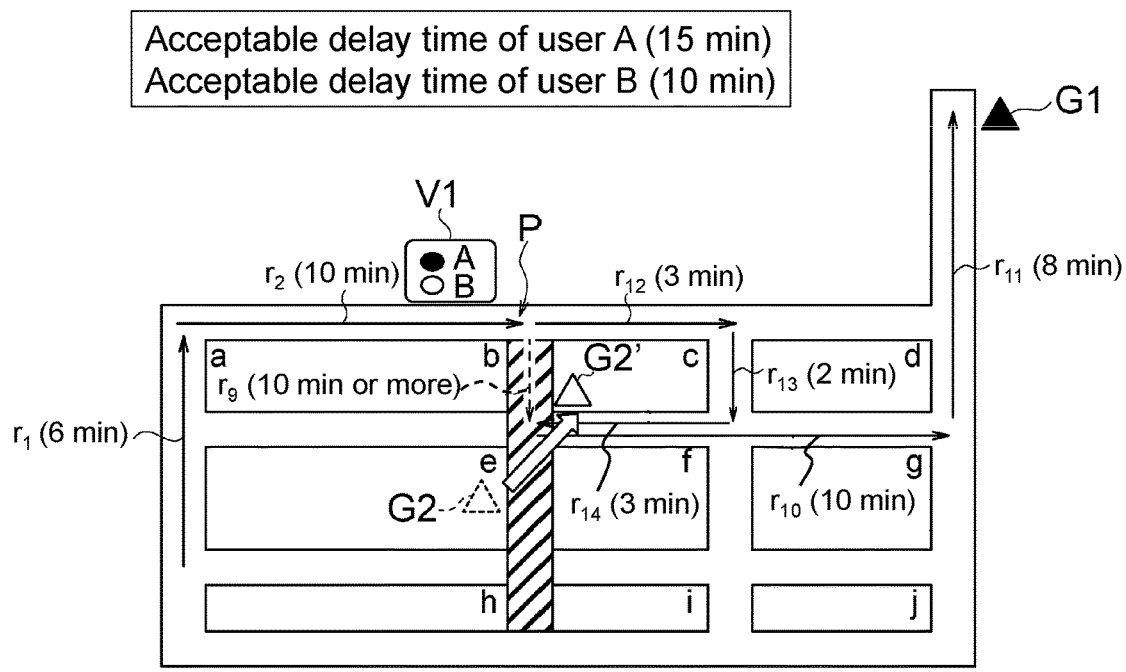

FIG. 7B (i) Before use request reception from user B

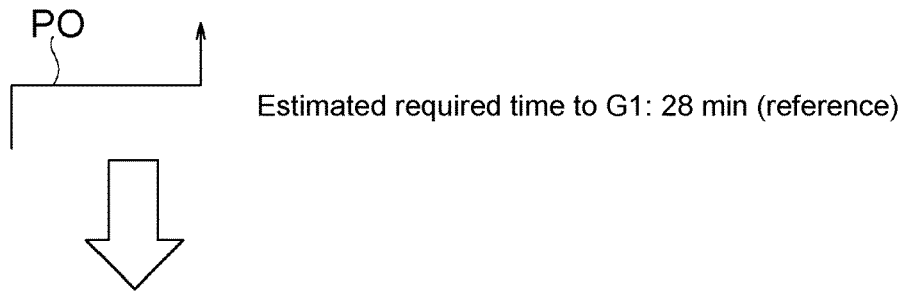

Estimated required time to G1: 28 min (reference)

(ii) After use request reception from user B

Estimated required time to G1: 40 min (+12 min)
Estimated required time to G2: 20 min (reference)

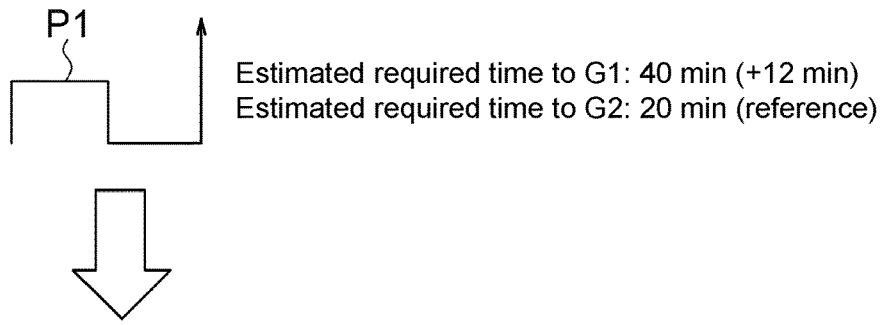

(iv) Alternative deboarding location is set after occurrence of traffic congestion

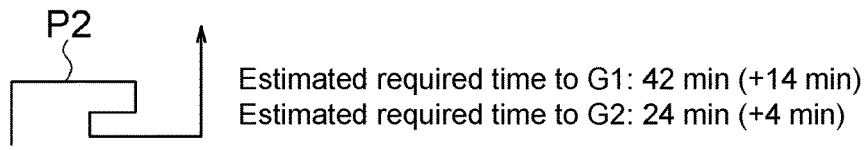

Estimated required time to G1: 42 min (+14 min)
Estimated required time to G2: 24 min (+4 min)

FIG. 8A
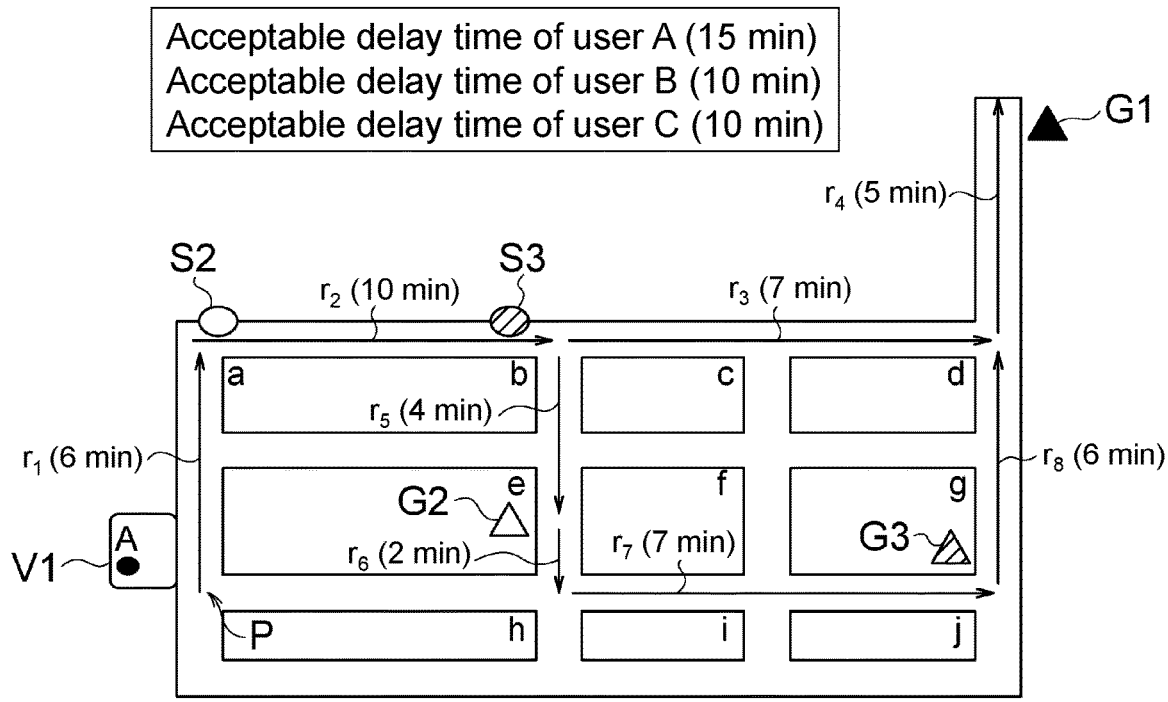
FIG. 8B
(i) Before use request reception from users B and C
Estimated required time to G1: 28 min (reference)
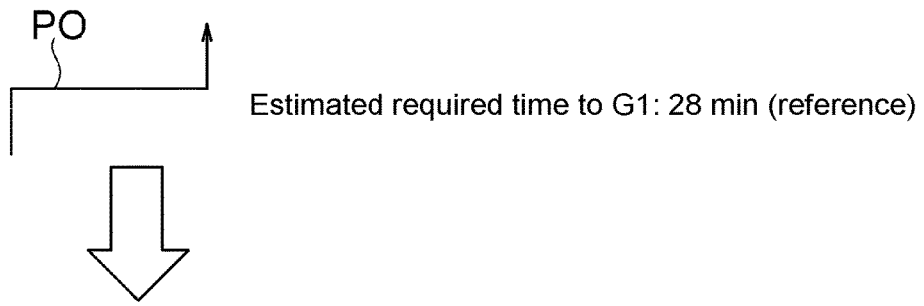
(ii) After use request reception from users B and C
Estimated required time to G1: 40 min (+12 min)
Estimated required time to G2: 20 min (reference)
Estimated required time to G3: 29 min (reference)
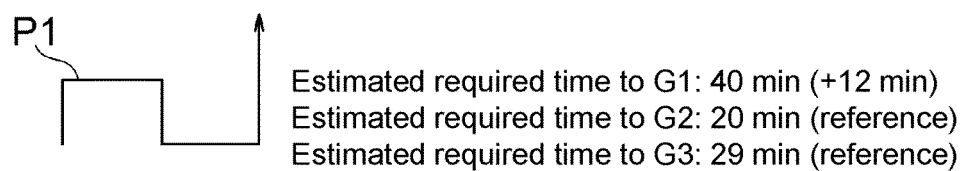

FIG. 9A

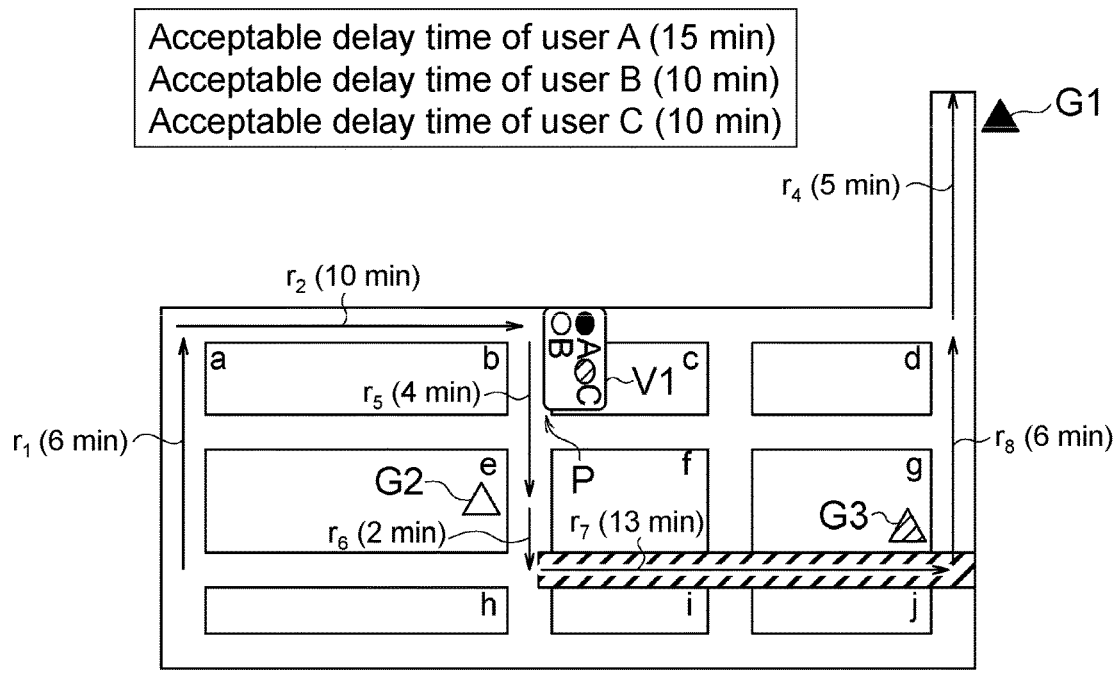

Acceptable delay time of user A (15 min)
Acceptable delay time of user B (10 min)
Acceptable delay time of user C (10 min)

FIG. 9B (i) Before use request reception from users B and C

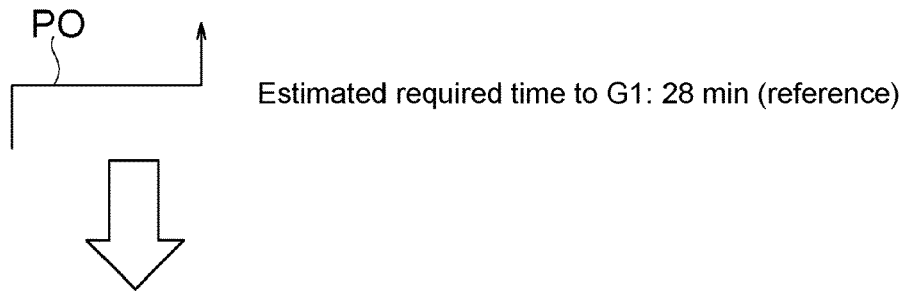

Estimated required time to G1: 28 min (reference)

(ii) After use request reception from users B and C

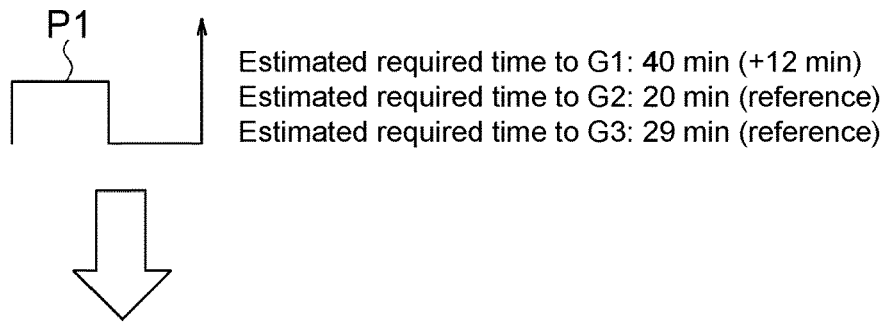

Estimated required time to G1: 40 min (+12 min)
Estimated required time to G2: 20 min (reference)
Estimated required time to G3: 29 min (reference)

(iii) After use request reception from users B and C

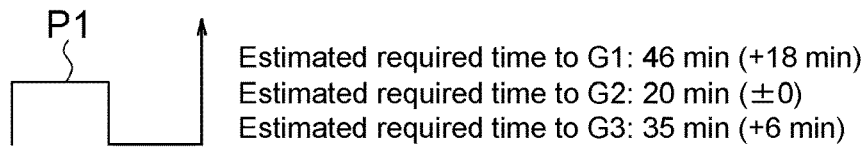

Estimated required time to G1: 46 min (+18 min)
Estimated required time to G2: 20 min (±0)
Estimated required time to G3: 35 min (+6 min)

FIG. 10A

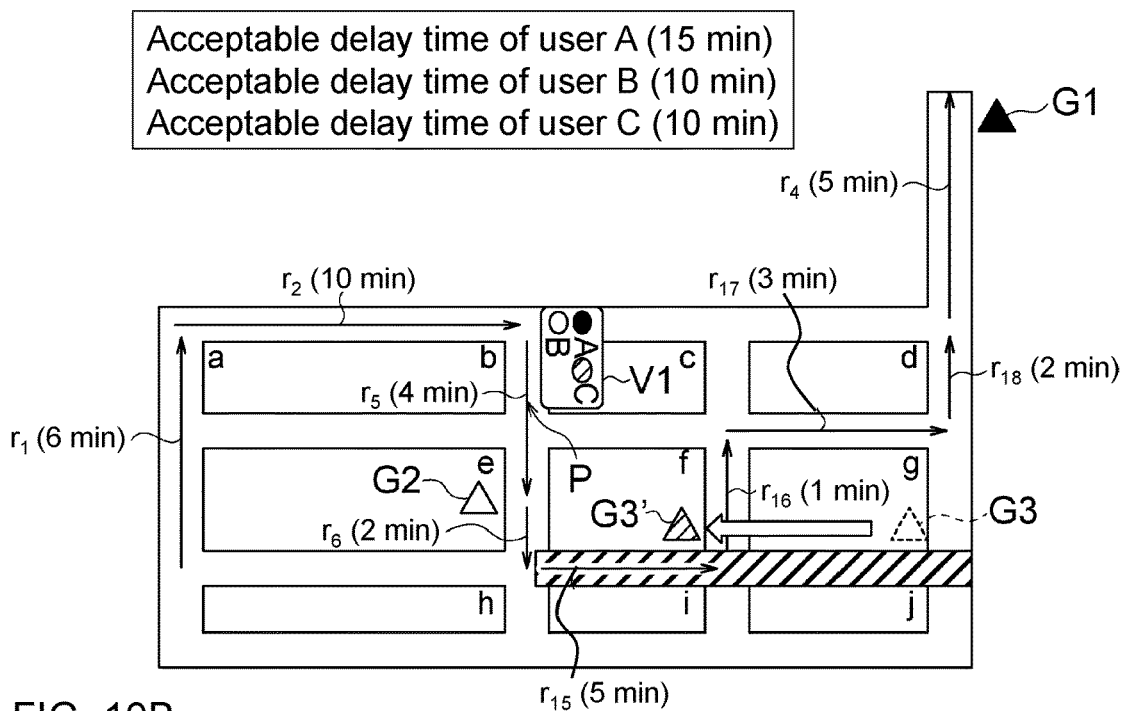

FIG. 10B (i) Before use request reception from users B and C

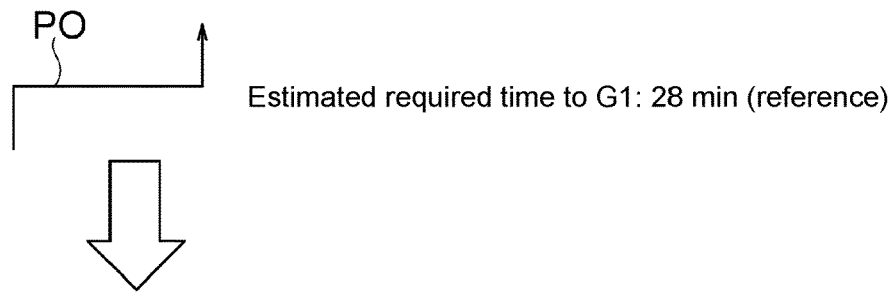

Estimated required time to G1: 28 min (reference)

(ii) After use request reception from users B and C

Estimated required time to G1: 40 min (+12 min)
Estimated required time to G2: 20 min (reference)
Estimated required time to G3: 29 min (reference)

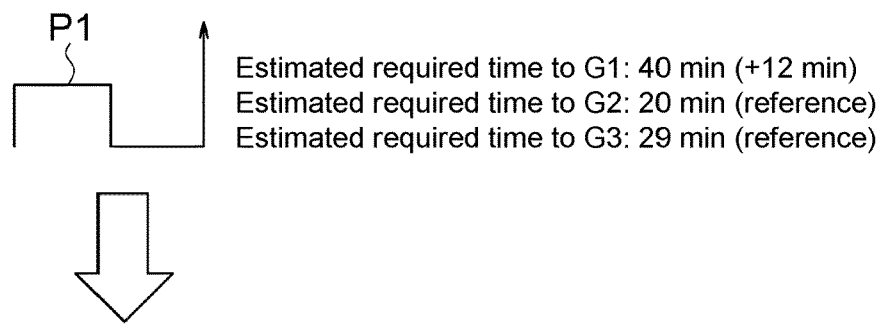

(iv) Alternative deboarding location is set after occurrence of traffic congestion

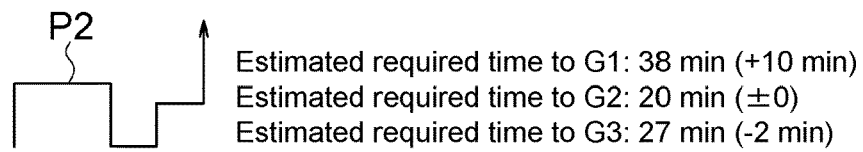

Estimated required time to G1: 38 min (+10 min)
Estimated required time to G2: 20 min (±0)
Estimated required time to G3: 27 min (-2 min)

FIG. 11A

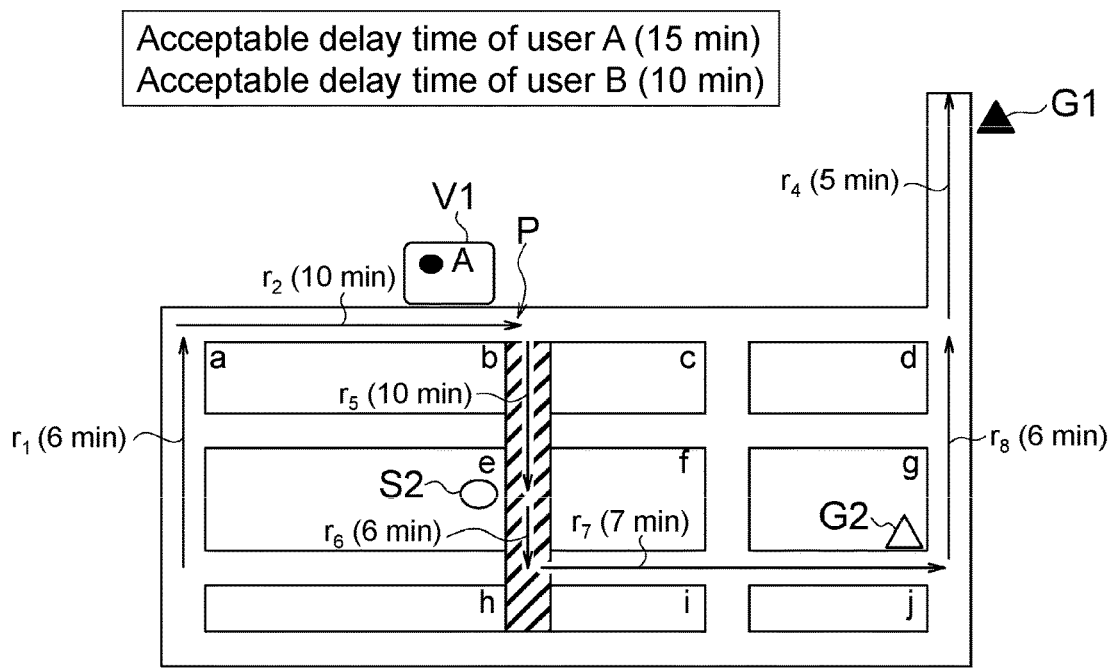

FIG. 11B (i) Before use request reception from user B

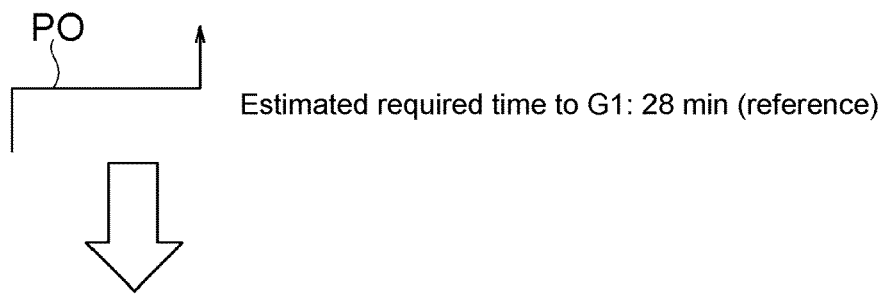

Estimated required time to G1: 28 min (reference)

(ii) After use request reception from user B

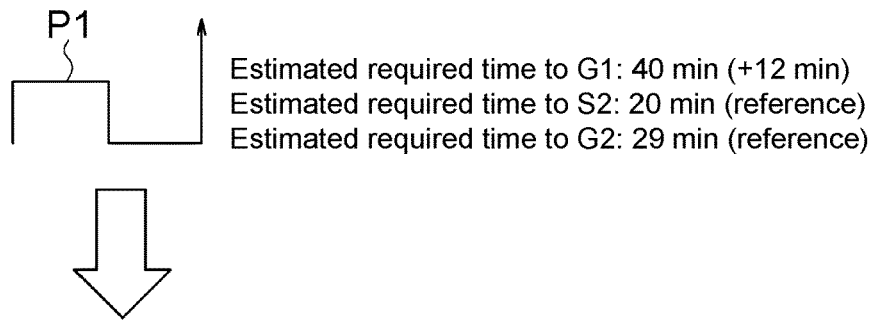

Estimated required time to G1: 40 min (+12 min)
Estimated required time to S2: 20 min (reference)
Estimated required time to G2: 29 min (reference)

(iii) After occurrence of traffic congestion

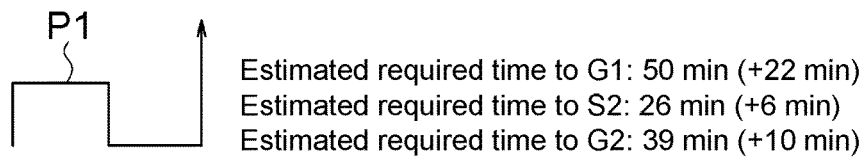

Estimated required time to G1: 50 min (+22 min)
Estimated required time to S2: 26 min (+6 min)
Estimated required time to G2: 39 min (+10 min)

FIG. 12A

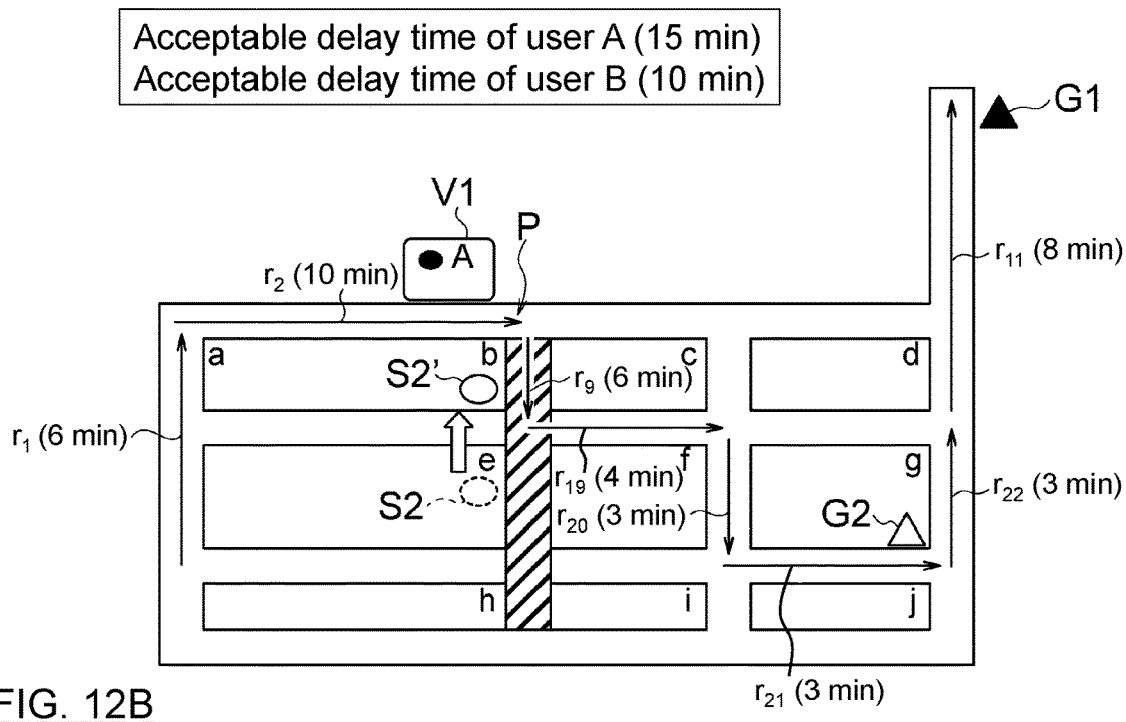

FIG. 12B (i) Before use request reception from user B

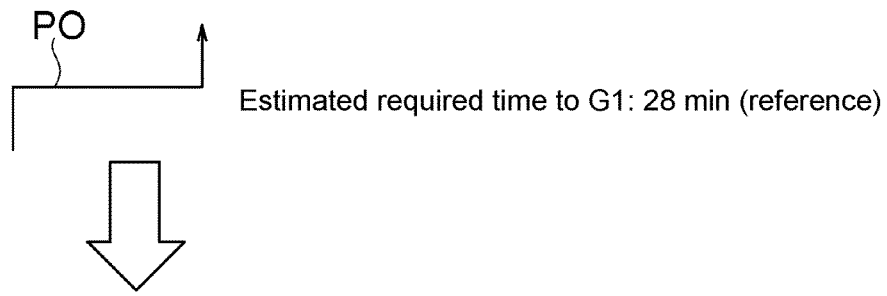

Estimated required time to G1: 28 min (reference)

(ii) After use request reception from user B

Estimated required time to G1: 40 min (+12 min)
Estimated required time to S2: 20 min (reference)
Estimated required time to G2: 29 min (reference)

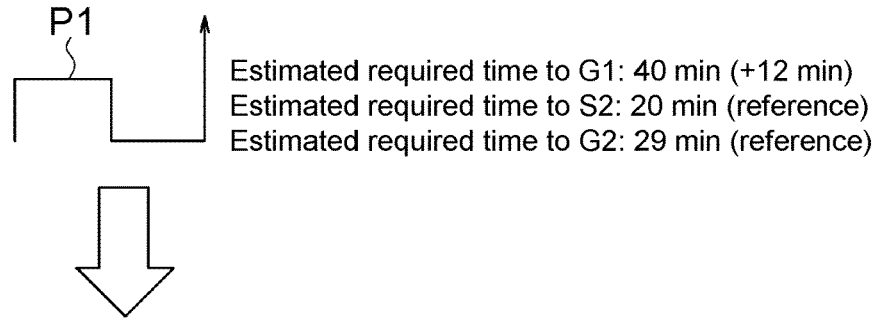

(iv) Alternative deboarding location is set after occurrence of traffic congestion

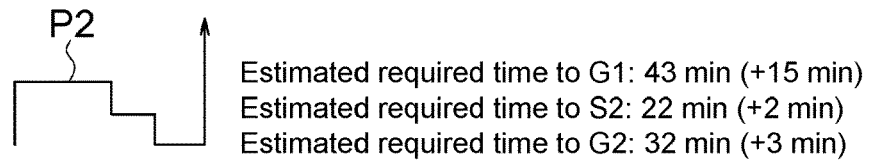

Estimated required time to G1: 43 min (+15 min)
Estimated required time to S2: 22 min (+2 min)
Estimated required time to G2: 32 min (+3 min)

SHARED VEHICLE MANAGEMENT METHOD AND SHARED VEHICLE MANAGEMENT DEVICE

TECHNICAL FIELD

The present invention relates to a shared vehicle management method and a shared vehicle management apparatus for managing a shared vehicle used by a plurality of users.

BACKGROUND ART

A method of determining a travel route is known which includes, when receiving a transportation request from a customer while carrying another customer or the like, determining the travel route on the basis of road traffic information so as to minimize an estimated time or the like required for completing the transportation of all the customers or the like (Patent Document 1: JP2002-183892A). By accepting the determined travel route or the like, the customer can share a ride on the vehicle which is carrying the other customer or the like.

PRIOR ART DOCUMENT

Patent Document

[Patent Document 1] JP2002-183892A

SUMMARY OF INVENTION

Problems to be Solved by Invention

In the above prior art, if the traffic environment on the travel route changes, such as due to the occurrence of traffic congestion, while the vehicle is traveling along the travel route to get off a user who shares a ride or to pick up a user who will share a ride, the delay time with respect to the estimated required time increases, which may be problematic.

A problem to be solved by the present invention is to reduce the delay time with respect to the estimated required time even when the traffic environment on the travel route changes while the vehicle is traveling along the travel route to get off a user who shares a ride or to pick up a user who will share a ride.

Means for Solving Problems

The present invention solves the above problem through calculating, on the basis of a desired condition of each of users sharing a ride on a shared vehicle, a first travel route for the shared vehicle to travel and a first required time for the shared vehicle to arrive at a destination on the first travel route, when a delay time with respect to the first required time exceeds a predetermined time while the shared vehicle is traveling along the first travel route, setting an alternative boarding location for a boarding location or an alternative deboarding location for a deboarding location on the basis of the desired condition of each of the users sharing a ride on the shared vehicle, calculating a second travel route including the alternative boarding location or the alternative deboarding location and a second required time for the shared vehicle to arrive at a destination on the second travel route, and notifying the users sharing a ride on the shared vehicle of at least the alternative boarding location or the alternative deboarding location and the second required time.

Effect of Invention

According to the present invention, it is possible to reduce the delay time with respect to the estimated required time even when the traffic environment on the travel route changes while the vehicle is traveling along the travel route to get off a user who shares a ride or to pick up a user who will share a ride.

BRIEF DESCRIPTION OF DRAWINGS

FIGS. 3A and 3B are a set of diagrams for describing a first travel route calculation function.

FIGS. 4A and 4B are a set of diagrams for describing a delay time detection function.

FIGS. 5A and 5B are a set of diagrams for describing an alternative destination setting function, a second travel route calculation function, and a second required time calculation function.

FIGS. 7A and 7B are a set of diagrams for describing a second travel route calculation function according to a third embodiment.

FIGS. 8A and 8B are a set of diagrams for describing a first travel route calculation function according to a fourth embodiment.

FIGS. 9A and 9B are a set of diagrams for describing a delay time detection function according to the fourth embodiment.

FIGS. 10A and 10B are a set of diagrams for describing an alternative destination setting function according to the fourth embodiment, a second travel route calculation function according to the fourth embodiment, and a second required time calculation function according to the fourth embodiment.

FIGS. 11A and 11B are a set of diagrams for describing a first travel route calculation function according to a modified example and a delay time detection function according to the modified example.

FIGS. 12A and 12B are a set of diagrams for describing an alternative destination setting function according to the modified example.

MODE(S) FOR CARRYING OUT THE INVENTION

Hereinafter, embodiments of the present invention will be described with reference to the drawings.

First Embodiment

The shared vehicle management apparatus according to an embodiment of the present invention will be described with reference to the drawings, hereinafter. The present embodiment will be described using an example in which the shared vehicle management apparatus is applied to a shared vehicle management system that manages and operates a car sharing system configured such that a plurality of users shares a plurality of vehicles allocated to a plurality of stations. In the car sharing system of the present embodiment, the station from which a shared vehicle is rented and the station to which the shared vehicle is returned may be or may not be the same. Each station represents a location at which shared vehicles can be parked, rented, and returned and shared vehicles not in use can be on standby. Examples of such stations include parking areas prepared for the car sharing system.

Figure 1A:
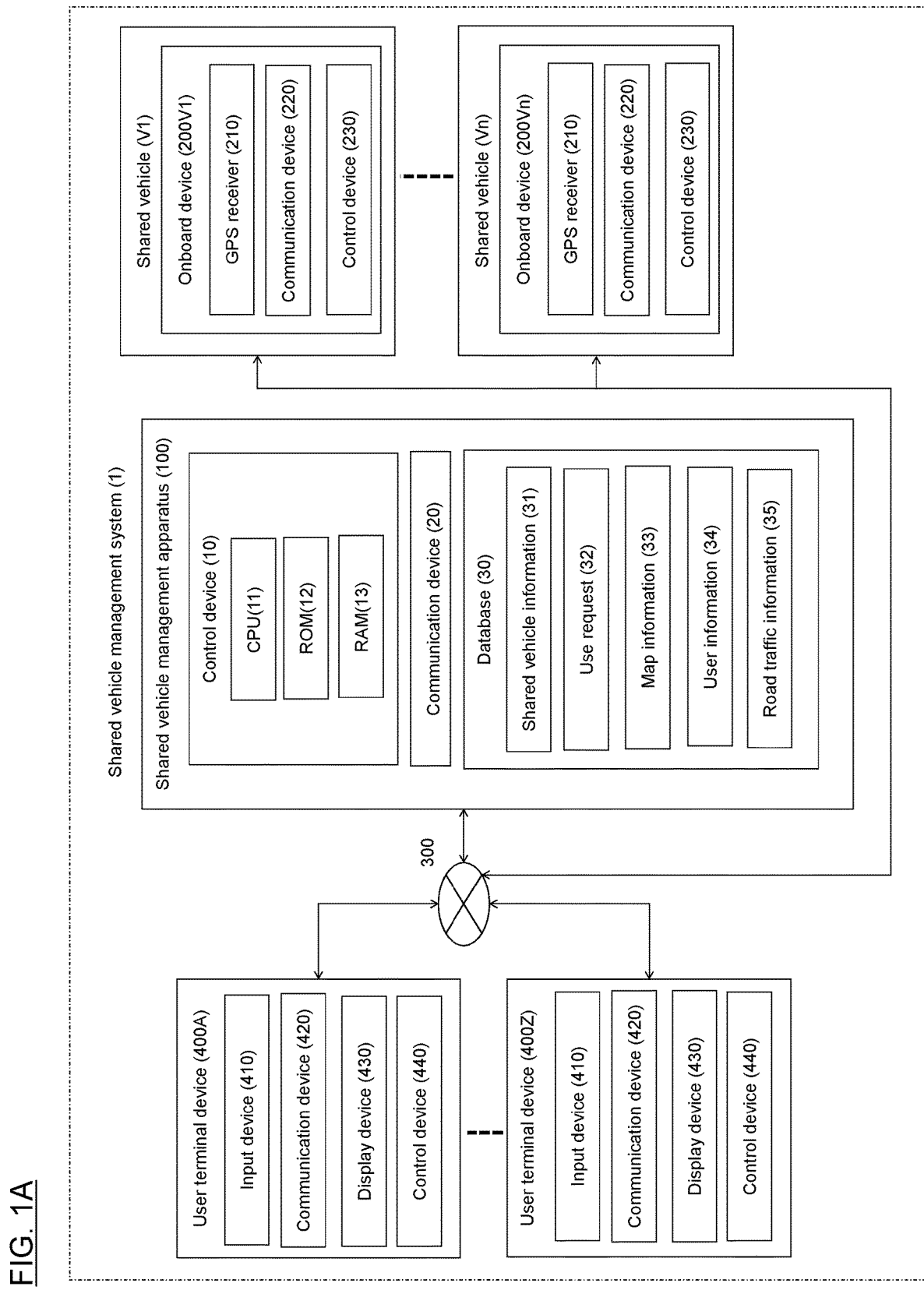
FIG. 1A is a block diagram of a shared vehicle management system according to a first embodiment.

FIG. 1A is a block diagram illustrating a shared vehicle management system 1 according to the present embodiment. As illustrated in FIG. 1A, the shared vehicle management system 1 according to the present embodiment includes a shared vehicle management apparatus 100, onboard devices 200V1 to 200Vn (which may be collectively referred to as an "onboard device 200Vn," hereinafter) carried respectively by shared vehicles V1 to Vn (which may be collectively referred to as a "shared vehicle Vn," hereinafter) used by the users, and user terminal devices 400A to 400Z (which may be collectively referred to as a "user terminal device 400A," hereinafter) carried by the users. The numbers of the onboard devices 200V1 to 200Vn and user terminal devices 400A to 400Z, which constitute the shared vehicle management system 1 according to the present embodiment, are not limited.

The shared vehicle management apparatus 100, the onboard devices 200V1 to 200Vn, and the user terminal devices 400A to 400Z include respective communication devices (20, 220, and 420) and can exchange information with one another via an electric communication network, such as the Internet 300. The communication path may be wired or wireless.

The user terminal device 400A of the present embodiment is a computer comprising a read only memory (ROM) that stores programs applied to the user terminal device 400A according to the present embodiment of the present invention, a central processing unit (CPU) as an operation circuit that executes the programs stored in the ROM to perform each function, and a random access memory (RAM) that serves as an accessible storage device. The user terminal device 400A of the present embodiment may be a personal computer, a smartphone, a personal digital assistant (PDA), or other handheld terminal device.

The user terminal device 400A of the present embodiment comprises an input device 410 that receives input information for requesting use of the shared vehicle Vn by each user, a communication device 420 that performs communication with external devices such as the shared vehicle management apparatus 100, a display device 430 for notifying each user of information, and a control device 440 that executes a control process for the use of the shared vehicle Vn by the user.

As the input device 410 of the user terminal device 400A, for example, a device with which the user can input data by manual operation, such as a touch panel disposed on the display screen or a joystick, and/or a device with which the user can input data by voice, such as a microphone, can be used.

The display device 430 notifies the user of information received from the shared vehicle management apparatus 100. Examples of the display device 430 include a display. When a touch panel display is used, it can serve as both the display device 430 and the input device 410. The display device 430 receives information on the travel route of the shared vehicle Vn and relevant information from the shared vehicle management apparatus 100, for example, and notifies the user of the received information.

The control device 440 of the present embodiment uses a position acquisition device, such as a global positioning system (GPS) receiver (not illustrated), equipped in the user terminal device 400A to acquire information on the current position of the user who operates the user terminal device 400A. Examples of the information on the current position include information on the latitude and longitude. The control device 440 transmits the acquired information on the current position to the shared vehicle management apparatus 100 via the communication device 420. In the present embodiment, the control device 440 periodically transmits the information on the current position of each user to the shared vehicle management apparatus 100. This allows a control device 10 of the shared vehicle management apparatus 100, which will be described later, to acquire the current positional information of each user.

In addition, the control device 440 receives input information, such as a use request for requesting use of the shared vehicle Vn by each user, and transmits the received input information to the shared vehicle management apparatus 100 via the communication device 420.

The above-described use request includes ID information of the user, information on the current position of the user, information on the departure place which the user desires, ID information of the shared vehicle Vn which the user expects to use, information on the destination which the user desires, and information on the use start time which the user desires and the delay time which the user can accept. The departure place which the user desires refers to a boarding location at which the user gets on the shared vehicle Vn while the destination which the user desires refers to a deboarding location at which the user gets off the shared vehicle Vn.

Information on the delay time which the user can accept (referred to as an "acceptable delay time," hereinafter) refers to a delay time which the user can accept when sharing a ride on the shared vehicle Vn together with one or more other users. In order for a plurality of users to share a ride on the shared vehicle Vn, the shared vehicle management apparatus 100 of the present embodiment executes a process of assigning the plurality of users, who made use requests, to one shared vehicle Vn. In general, when a user shares or expects to share a ride on the shared vehicle Vn together with another user, the shared vehicle Vn passes through the boarding location or deboarding location of the other user in addition to the boarding location or deboarding location of that user. Accordingly, a delay occurs in the estimated required time to the boarding location or deboarding location of each user. In the present embodiment, therefore, the acceptable delay time is defined as a condition when assigning a user to the shared vehicle Vn. The process executed by the shared vehicle management apparatus 100 to assign one or more users, who made use requests, to the shared vehicle Vn will be described later.

In the present embodiment, one or both of the user terminal device 400A and the onboard device 200Vn may serve as a navigation device for guiding a travel route of the shared vehicle Vn to the user. When the user terminal device 400A serves as a navigation device, the user terminal device 400A may preliminarily store map information, for example, in a memory such as a ROM of the user terminal device 400A. The user terminal device 400A may receive the travel route and the estimated required time which are calculated by the shared vehicle management apparatus 100. The user terminal device 400A may display on the display device 430 the current position of the shared vehicle Vn which is currently used by the user and the position of the destination of the shared vehicle Vn, together with the map information, and guide the travel route from the current position of the shared vehicle Vn to the destination.

Examples of the shared vehicle Vn of the present embodiment include an electric car equipped with an electric motor as the drive source, an engine car equipped with an internal combustion engine as the drive source, and a hybrid car equipped with both an electric motor and an internal combustion engine as the drive sources. The electric cars and hybrid cars equipped with electric motors as the drive sources include those in which secondary batteries are used as power sources for the electric motors and those in which fuel cells are used as power sources for the electric motors. In the present embodiment, it is assumed that the user who made the use request drives the shared vehicle Vn to the destination.

The onboard device 200Vn of the present embodiment comprises a GPS receiver 210 that detects the current position of each shared vehicle Vn, a communication device 220 that performs communication with external devices such as the shared vehicle management apparatus 100, and a control device 230 that executes a control process for the use of the shared vehicle Vn by the user.

The onboard device 200Vn may be provided as a simple mechanism that utilizes functions of the user terminal device 400A. For example, when the user terminal device 400A is equipped with a GPS receiver, a communication device, devices for route calculation and route guidance, and other similar devices, the onboard device 200Vn may utilize their functions and perform only authentication of a user, which will be described below.

In the present embodiment, the control device 230 may use an authentication device (not illustrated) of the onboard device 200Vn to perform user authentication as to whether or not the user getting on the shared vehicle Vn is identical with the user who has requested use of the shared vehicle Vn. For example, the control device 230 uses a device capable of communication via near field communication (NFC) as the authentication device to read ID information of the user, such as from the user terminal device 400A or membership card carried by the user. The control device 230 accesses the shared vehicle management apparatus 100 via the communication device 220 to acquire the information on the use request for the shared vehicle Vn and performs user authentication of the user getting on the shared vehicle Vn.

The control device 230 transmits the information on the current position acquired using the GPS receiver 210 to the shared vehicle management apparatus 100 via the communication device 220.

The control device 230 notifies the user of the information transmitted from the shared vehicle management apparatus 100 and other information, such as using a display and/or a speaker, which are not illustrated. In the present embodiment, the control device 230 receives information regarding users who desire to share a ride on the shared vehicle Vn, the travel route of the shared vehicle Vn, the estimated required time, and other information from the shared vehicle management apparatus 100 and notifies the user of the received information. The ride-sharing and other similar terms as used in the present embodiment refer to a situation in which two or more persons get on one shared vehicle and, for example, refer to a situation in which a user and one or more other users get on one shared vehicle.

In the present embodiment, like the above-described user terminal device 400A, the onboard device 200Vn may also serve as a navigation device for guiding the travel route from the current position of the shared vehicle Vn to the destination.

The shared vehicle management apparatus 100 of the present embodiment, which serves as a server of the shared vehicle management system 1, comprises a control device 10 that executes a control process for managing and operating the car sharing system, a communication device 20 that can communicate mutually with each of the onboard device 200Vn and the user terminal device 400A, and a database 30 that stores the information received by the communication device 20, the information on each shared vehicle Vn, and other necessary information.

The database 30 stores shared vehicle information 31, a use request 32 received from a user, map information 33, user information 34, and road traffic information 35.

The shared vehicle information 31 is information regarding each shared vehicle Vn. The shared vehicle information 31 includes information on the current position of each shared vehicle Vn, the remaining power capacity and failure information of each shared vehicle Vn, a current usage situation of each shared vehicle Vn, and the like.

The use request 32 is input information, which each user inputs using the user terminal device 400A, for requesting use of the shared vehicle Vn. The use request 32 includes ID information of the user, ID information of the shared vehicle Vn which the user expects to use, information on the current position of the user, information representing the departure place, destination, use start time and acceptable delay time which are set by the user, and other information.

The map information 33 is map information that also includes information on roads, facilities, and the like. The map information 33 includes, for example, information regarding each station, such as positional information of each station, facility information around each station, traffic conditions around each station, and usage situations of each station.

The user information 34 is information on all the users who can use the car sharing system. The user information 34 includes ID information of all the users and information on current positions of all the users. For example, the communication device 20 receives the current positional information of each user at predetermined intervals from the user terminal device 400A of each user thereby to allow the current positional information of each user to be stored as the user information 34. The user information 34 may include information on the use history of each user who used the shared vehicle Vn. This use history includes at least information on the departure place and destination which were set by the user, the location at which the user actually got on the shared vehicle, the location at which the user actually got off the shared vehicle, and the time slot in which the user used the shared vehicle.

The road traffic information 35 is information on the traffic regulation and congestion. Examples of the road traffic information 35 include information received from the Vehicle Information and Communication System (VICS) (registered trademark), which is provided outside the vehicle, via the communication device 20. The information received from the VICS includes information on the congestion situation (such as a vehicle speed and a required time for passing) of a road.

Figure 2:
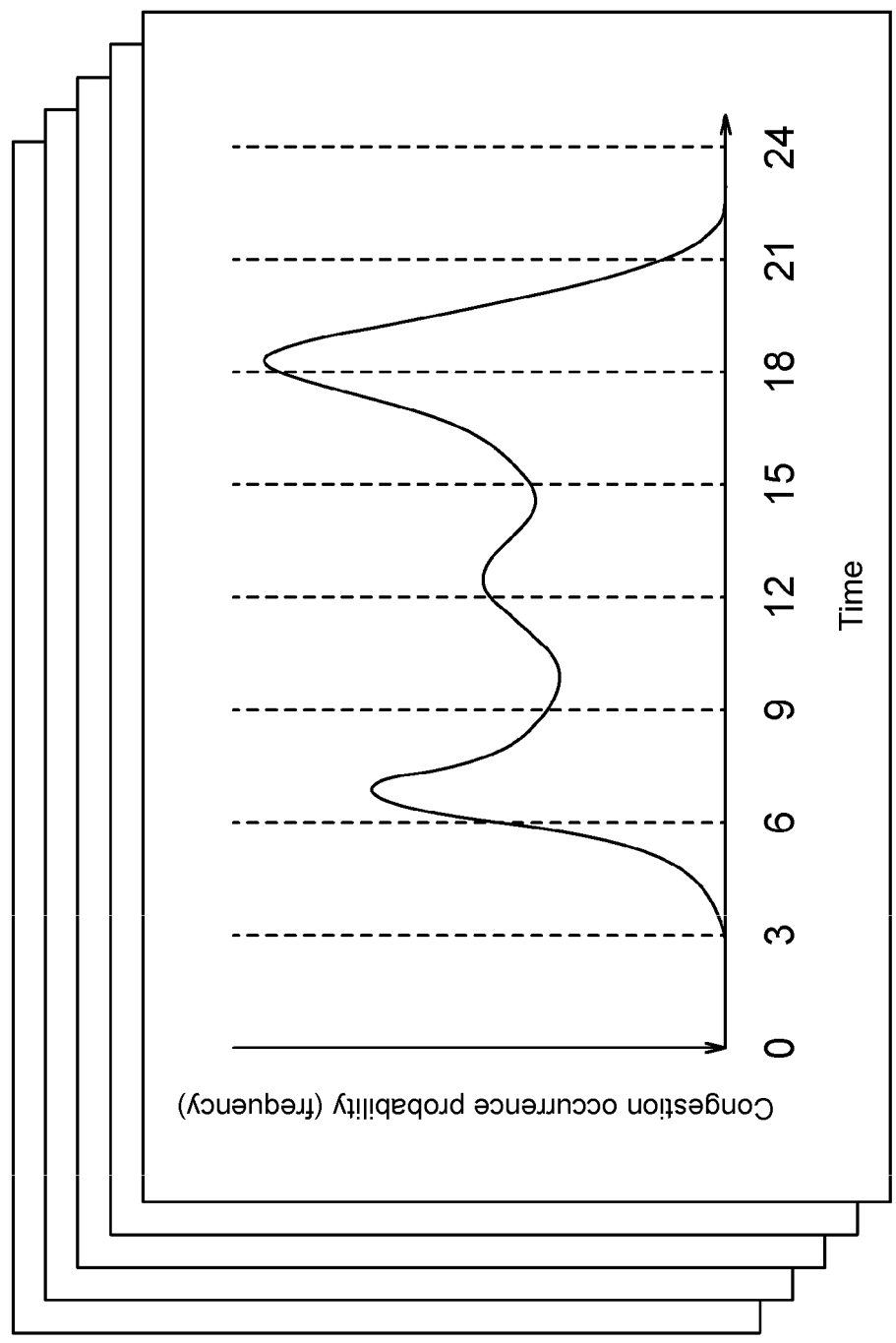
FIG. 2 illustrates an example of data representing the occurrence probability of traffic congestion with respect to each time slot of a day.

In the present embodiment, the road traffic information 35 includes not only information on the current traffic regulation and congestion, but also data indicating the occurrence probability of congestion with respect to each time slot of a day. As the road traffic information 35, for example, a graph in which the horizontal axis represents the time and the vertical axis represents the congestion occurrence probability as illustrated in FIG. 2 can be exemplified. The example of FIG. 2 indicates that the occurrence probability of congestion is high around 7 o'clock and 18 o'clock. The graph of FIG. 2 is stored as the road traffic information 35 for each road, each day, and each state of weather. FIG. 2 illustrates an example of data representing the occurrence probability of congestion with respect to each time slot of a day.

Referring again to FIG. 1A, the shared vehicle management system 1 will be described. As illustrated in FIG. 1A, the control device 10 of the shared vehicle management apparatus 100 of the present embodiment comprises a read only memory (ROM) 12 that stores programs for executing processes to manage and operate the car sharing system, a central processing unit (CPU) 11 as an operation circuit that executes the programs stored in the ROM 12 to serve as the shared vehicle management apparatus 100, and a random access memory (RAM) 13 that serves as an accessible storage device.

Figure 1B:
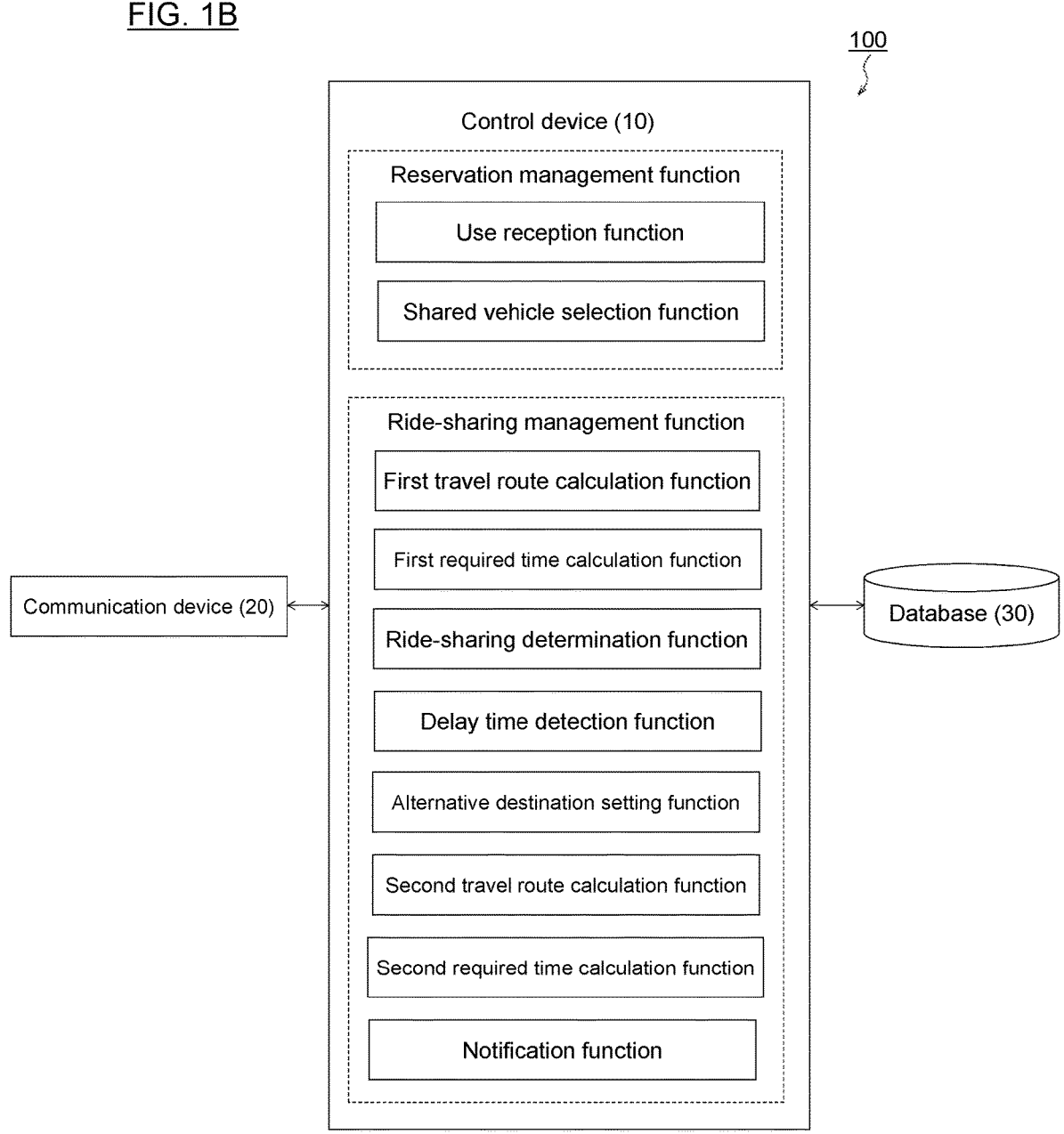
FIG. 1B is a block diagram of a shared vehicle management apparatus illustrating the functions of a control device according to the first embodiment.

As illustrated in FIG. 1B, the control device 10 of the shared vehicle management apparatus 100 achieves a reservation management function and a ride-sharing management function. The reservation management function includes a use reception function and a shared vehicle selection function. The ride-sharing management function includes a first travel route calculation function, a first required time calculation function, a ride-sharing determination function, a delay time detection function, an alternative destination setting function, a second travel route calculation function, a second required time calculation function, and a notification function. The control device 10 of the shared vehicle management apparatus 100 according to the present embodiment is a computer that realizes each function by cooperation of software for achieving the above functions and the above-described hardware. FIG. 1B is a block diagram of the shared vehicle management apparatus 100 illustrating the functions of the control device 10 of the present embodiment.

The above functions achieved by the control device 10 of the shared vehicle management apparatus 100 will be described below.

First, in the reservation management function executed by the control device 10 of the present embodiment, the use reception function will be described. The control device 10 uses the use reception function to sequentially acquire use requests for requesting use of a shared vehicle Vn from users via the user terminal device 400A. Then, the control device 10 controls the database 30 to store the acquired information on the use requests together with the information on the time (reservation time) at which the use requests were received.

For example, a user activates the communication device 420 of the user terminal device 400A to access the shared vehicle management apparatus 100 and specifies a desired type of vehicle which the user desires to get on from the shared vehicle information 31 stored in the database 30 of the shared vehicle management apparatus 100. The user also inputs a use start time as the time to start use of the shared vehicle Vn to the input device 410 of the user terminal device 400A. The user further inputs to the input device 410 the departure place as a location at which the user gets on the shared vehicle Vn and the destination as a location at which the user gets off the shared vehicle Vn. In addition, the user inputs information indicating whether or not the user can share a ride on the shared vehicle Vn to be used by the user (information as to whether the ride-sharing is acceptable or not) and the acceptable delay time. The acceptable delay time is input as a delay time which the user can accept when the user shares or expects to share a ride on the shared vehicle Vn together with one or more other users. The user terminal device 400A transmits the input information to the shared vehicle management apparatus 100 via the communication device 420. The shared vehicle management apparatus 100 receives the vehicle type, the use start time, the departure place, the destination, the information as to whether the ride-sharing is acceptable or not, and the acceptable delay time, as the user's desired condition.

The information transmitted from the user terminal device 400A to the shared vehicle management apparatus 100 may include not only the user's desired condition but also personal information of the user, such as the gender and age (generation). The control device 10 stores the received personal information of the user as the user information 34 of the database 30.

Next, in the reservation management function executed by the control device 10 of the present embodiment, the shared vehicle selection function will be described. The control device 10 uses the shared vehicle selection function to allocate the shared vehicle Vn to each user on the basis of the shared vehicle information 31, the use request 32, and the user information 34 thereby to select a shared vehicle on which a plurality of users shares a ride.

With reference to an example of a scene in which a user A who accepts ride-sharing uses a shared vehicle V1, a process executed by the control device 10 will be described. In this scene, when acquiring a use request from another user B who can share a ride, the control device 10 assigns the user B to a specific shared vehicle Vn that is currently used, on the basis the desired condition of the user B. For example, the control device 10 assigns the user B to the shared vehicle V1. In other words, the shared vehicle V1 is selected as a vehicle on which a plurality of users shares a ride.

The criteria for determining whether to assign the user, who made the use request, to the specific shared vehicle Vn being used are not particularly limited. The control device 10 can appropriately assign the user, who made the use request, to the shared vehicle Vn on the basis of the relationship between the current position of the user who made the use request and the current position of the shared vehicle Vn. In the example of the above-described scene, when the shared vehicle V1 is traveling around the current position of the user B, the control device 10 assigns the user B to the shared vehicle V1. At this time, the control device 10 may take into account the number of passengers on the shared vehicle V1, which is traveling, to determine whether or not the ride-sharing on the shared vehicle V1 is possible. For example, when the number of passengers on the shared vehicle V1 is the maximum number, the control device 10 may assign the user B to a shared vehicle V2 traveling around the current position of the user B rather than the shared vehicle V1.

The control device 10 can appropriately assign the user, who made the use request, to the shared vehicle Vn on the basis of the personal information of the user. In the example of the above-described scene, when the gender of the user A and the gender of the user B are the same, the control device 10 may assign the user B to the shared vehicle V1. In addition or alternatively, when the generation of the user A and the generation of the user B are the same, for example, the control device 10 may assign the user B to the shared vehicle V1.

Next, with reference to an example of a scene in which the shared vehicle V1 is not used by a specific user, a process executed by the control device 10 will be described. In this scene, when a plurality of users (including the user A and the user B) who can share a ride makes use requests, the control device 10 assigns the users to a specific shared vehicle Vn on the basis of the current positional information of the users and/or the personal information of the users.

For example, the control device 10 executes a clustering process on a plurality of departure places or a plurality of destinations acquired from the plurality of users and specifies a plurality of users whose departure places or destinations are in the same direction. For example, when the departure place and destination of the user A and the departure place and destination of the user B are in the same direction, the control device 10 executes the clustering process to specify the user A and the user B from among the plurality of users. Then, the control device 10 assigns the user A and the user B to the shared vehicle V1 waiting at the station. The control device 10 is not limited to executing the clustering process with respect to the departure places or the destination places and may execute the clustering process, for example, with respect to the current positions of the users or the personal information of the users (such as gender and generation).

The control device 10 executes the above-described process to select a specific shared vehicle Vn on which a plurality of users can share a ride.

Next, in the ride-sharing management function executed by the control device 10 of the present embodiment, the first travel route calculation function will be described with reference to FIG. 3A and FIG. 3B. FIG. 3A and FIG. 3B are a set of diagrams for describing the first travel route calculation function. FIG. 3A is a diagram for describing a first travel route and a first required time. FIG. 3B is a diagram in which the travel route and required time illustrated in FIG. 3A are extracted.

FIG. 3A illustrates a scene in which the user B makes a use request for the shared vehicle Vn while the user A is moving to a deboarding location G1 using the shared vehicle V1. It is assumed that the user B has been assigned to the shared vehicle V1 on the basis of the use condition. P represents the current position of the shared vehicle V1, G1 represents the deboarding location which is set by the user A, S2 represents the boarding location which is set by the user B, and G2 represents the deboarding location which is set by the user B. "a" to "j" represent intersections and $r_1$ to $r_6$ represent routes. Required times for the shared vehicle V1 to travel along the routes $r_1$ to $r_6$ are in parentheses behind $r_1$ to $r_6$, respectively. These times are each an estimated time with consideration for the road traffic information. Examples of the estimated time include an estimated time that is determined with consideration for the congestion situation of a road and transmitted from the VICS. The user A sets the acceptable delay time to 15 minutes while the user B sets the acceptable delay time to 10 minutes.

First, when there is no user who shares a ride on the shared vehicle Vn, the control device 10 calculates a travel route for the shared vehicle Vn to travel and an estimated required time (estimated required time before ride-sharing) for the shared vehicle Vn to arrive at the destination which is set by the user who uses the shared vehicle Vn. In the example of FIG. 3A, the control device 10 calculates a travel route P0 (route composed of "$r_1 \rightarrow r_2 \rightarrow r_3 \rightarrow r_4$") from the current position P to the deboarding location G1. The control device 10 also calculates an estimated required time (estimated required time before ride-sharing: 28 minutes) for the shared vehicle V1 to travel along the travel route P0 and arrive at the deboarding location G1. The estimated required time before ride-sharing consists of 6 minutes for the route $r_1$, 10 minutes for the route $r_2$, 7 minutes for the route $r_3$, and 5 minutes for the route $r_4$. The process of calculating the above-described travel route and estimated required time may be the same as the process executed by a commonly-used navigation system.

Then, the control device 10 determines whether or not the user who made the use request can share a ride as the shared vehicle Vn travels along the current travel route. When determining that the user who made the use request can share a ride, the control device 10 does not change the current travel route. On the other hand, when determining that the user who made the use request cannot share a ride, the control device 10 calculates a first travel route so as to arrive at the destination, which is set by the user who is using the shared vehicle Vn, via the departure place and destination which are set by the user who made the use request. In the example of FIG. 3A, the boarding location S2 is located on the travel route P0, but the deboarding location G2 is not located on the travel route P0; therefore, the user B cannot get off the shared vehicle V1 as the shared vehicle V1 travels merely along the travel route P0, and the control device 10 determines that the user B cannot share a ride. Then, the control device 10 calculates a first travel route P1 (route composed of "$r_1 \rightarrow r_2 \rightarrow r_5 \rightarrow r_6 \rightarrow r_7 \rightarrow r_8 \rightarrow r_4$") as the route from the current position P to the deboarding location G1 via the boarding location S2 and the deboarding location G2.

Here, as described above, in general, when the on-board user and the user who made the use request expect to share a ride on the shared vehicle Vn, the estimated required time before ride-sharing increases. In the present embodiment, the control device 10 calculates the first travel route such that the estimated required time before ride-sharing does not increase in terms of the acceptable delay time even when the on-board user and the user who made the use request share a ride on the shared vehicle Vn. In the example of FIG. 3A, the control device 10 calculates the first travel route P1 such that the estimated required time (28 minutes) before ride-sharing does not increase in terms of the acceptable delay time (15 minutes) which is set by the user A. The control device 10 temporarily stores the estimated required time before ride-sharing in a RAM as a reference time for the user who is using the shared vehicle Vn.

It suffices that the first travel route is a route on which the user who made the use request can get on or get off the shared vehicle and with which the estimated required time to the destination set by the user who is using the shared vehicle does not unduly increase in terms of the acceptable delay time set by the user who made the use request, and other conditions for the first travel route are not particularly limited. In the example of FIG. 3A, the control device 10 may calculate the first travel route P1 such that the shared vehicle V1 can arrive at the deboarding location G1 with the shortest distance or in the shortest time. In addition or alternatively, for example, the control device 10 may calculate the first travel route P1 such that the shared vehicle V1 can arrive at the boarding location S2 or the deboarding location G2 with the shortest distance or in the shortest time. In addition or alternatively, for example, the control device 10 may calculate the first travel route P1 so as to reduce the travel cost of the shared vehicle V1. In addition or alternatively, when calculating the first travel route, the control device 10 may take into account the road traffic information as illustrated in FIG. 2. By taking into account the road traffic information, it is possible to accurately calculate the first travel route P1 along which, for example, the shared vehicle V1 can arrive at the boarding location S2 or the deboarding location G2 in the shortest time.

The first travel route calculated by the above-described process will be described with reference to FIG. 3B. As illustrated in FIG. 3B, before the use request from the user B is received, the travel route P0 for the shared vehicle V1 to travel is a travel route with the shortest distance from the current position P to the deboarding location G1. On the other hand, after the use request from the user B is received, the shared vehicle V1 has to pass through the boarding location S2 and the deboarding location G2. Accordingly, the first travel route P1 is a travel route detoured via the deboarding location G2 rather than the travel route with the shortest distance to the deboarding location G1.

After calculating the first travel route, the control device 10 calculates again the estimated required time (required time after ride-sharing) for the shared vehicle Vn to arrive at the destination which is set by the user who is using the shared vehicle Vn. In the example of FIG. 3A, the control device 10 calculates the estimated required time (estimated required time after ride-sharing: 40 minutes) for the shared vehicle V1 to travel along the first travel route P1 and arrive at the deboarding location G1. The estimated required time after ride-sharing consists of 6 minutes for the route $r_1$, 10 minutes for the route $r_2$, 4 minutes for the route $r_5$, 2 minutes for the route $r_6$, 7 minutes for the route $r_7$, 6 minutes for the route $R_8$, and 5 minutes for the route $r_4$.

Next, in the ride-sharing management function executed by the control device 10 of the present embodiment, the first required time calculation function will be described with reference to FIGS. 3A and 3B. The control device 10 uses the first required time calculation function to calculate a first required time as the time required for the shared vehicle Vn to arrive at each of the destinations on the first travel route.

The destinations on the first travel route refer to the boarding locations or deboarding locations which are set by the users who share a ride on the shared vehicle Vn. In the example of FIG. 3A, the users who share a ride on the shared vehicle Vn refer to the user A who is using the shared vehicle V1 and the user B who made the use request. The users who share a ride on the shared vehicle Vn also include users who will now get on the shared vehicle Vn.

One or more destinations can be considered as those on the first travel route. In the example of FIG. 3A, the first travel route P1 is a travel route from the current position P to the deboarding location G1 via the boarding location S2 and the deboarding location G2. In this case, the boarding location S2, the deboarding location G2, and the deboarding location G1 correspond to the destinations on the first travel route P1. The control device 10 calculates the time required for the shared vehicle V1 to arrive at each point on the first travel route P1. Specifically, the control device 10 calculates the estimated required time to the boarding location S2 as 6 minutes, the estimated required time to the deboarding location G2 as 20 minutes, and the estimated required time to the deboarding location G1 as 40 minutes. The control device 10 also calculates the estimated on-board time of the user B on the shared vehicle V1 as 14 minutes.

Next, in the ride-sharing management function executed by the control device 10 of the present embodiment, the ride-sharing determination function will be described with reference to FIGS. 3A and 3B. The control device 10 uses the ride-sharing determination function to notify the user, who is using the shared vehicle Vn, and the user, who made the use request, of the information regarding the ride-sharing. Examples of the information regarding the ride-sharing include the first travel route, the estimated required time (first required time) to a boarding location or a deboarding location on the first travel route, and ID information of each user. This allows the user, who is using the shared vehicle Vn, to know how long the time to arrive at the deboarding location will be delayed. In addition, the user who made the use request can know the time before which the user should arrive at the boarding location in order to share a ride. Then, when the notified information is not problematic, the user who is using the shared vehicle Vn and the user who made the use request send messages that they accept the ride-sharing on the shared vehicle V1 to the shared vehicle management apparatus 100 via the communication device 220 or the communication device 420. The control device 10 may provide the time period in which the user who made the use request is on the shared vehicle Vn. In the example of FIG. 3A, the control device 10 notifies the user A and the user B of the first travel route P1, the estimated required time (6 minutes) to the boarding location S2, the estimated required time (22 minutes) to the deboarding location G2, and the estimated required time (40 minutes) to the deboarding location G1.

When the control device 10 acquires via the communication device 20 the messages that the user who is using the shared vehicle Vn and the user who made the use request accept the ride-sharing, the control device 10 updates the first travel route as the travel route for the shared vehicle Vn. The control device 10 also updates the first required time as the estimated required time for arriving at the destination on the first travel route. Then, the control device 10 uses the communication device 20 to notify the user, who is using the shared vehicle Vn, and the user, who made the use request, of the information indicating that the ride-sharing is determined and the information including the first travel route and the first required time.

In the following description, the control device 10 treats the estimated required time before ride-sharing as the initially estimated required time to the destination which is set by the user who is using the shared vehicle Vn and treats the first required time as the initially estimated required time to the departure place or destination which is set by the user who made the use request. The control device 10 temporarily stores these initially estimated required times in a RAM. In the example of FIGS. 3(A) and 3(B), the initially estimated required time for the user A is 28 minutes, and the initially estimated required time for the user B is 20 minutes.

Next, in the ride-sharing management function executed by the control device 10 of the present embodiment, the delay time detection function will be described with reference to FIGS. 4A and 4B. FIGS. 4A and 4B are a set of diagrams for describing the delay time detection function. FIG. 4A is a diagram for describing a delay time and FIG. 4B is a diagram illustrating transition of the travel route illustrated in FIG. 4A and the estimated required time for the travel route.

FIG. 4A illustrates a scene in which a certain time has elapsed from the scene of FIG. 3A. In FIG. 4A, the same parts as those in FIG. 3A are denoted by the same symbols. The shared vehicle V1 is traveling along the route $r_2$ after picking up the user B at the boarding location S2 (see FIG. 3A) and is about to turn to the right at the intersection "b" to follow the first travel route P1. In FIG. 4A, traffic congestion that has not occurred at the time point illustrated in FIG. 3A occurs in the section from the intersection "b" to the intersection "h." Accordingly, FIG. 4A illustrates that traveling along the route $r_5$ requires 10 minutes and traveling along the route $r_6$ requires 6 minutes.

The control device 10 uses the delay time detection function to detect a delay time with respect to the initially estimated required time to the departure place or destination which is set by each user. After the user who is using the shared vehicle Vn and the user who made the use request accept the ride-sharing, the control device 10 determines, at predetermined intervals, whether or not a delay occurs with respect to the estimated required time to the boarding location or deboarding location of each user.

Specifically, first, the control device 10 calculates, at predetermined intervals, the estimated required time to the departure place or destination which is set by each user. Then, the control device 10 calculates a delay time by comparing the estimated required time thus calculated with the initially estimated required time, stored in the RAM, to the departure place or destination which is set by each user. In the example of FIG. 4A, the control device 10 detects a delay time with respect to the estimated required time to the deboarding location G1 and a delay time with respect to the estimated required time to the deboarding location G2. The control device 10 calculates the delay time (22 minutes) with respect to the estimated required time to the deboarding location G1 on the basis of the estimated required time calculated as the above (50 minutes) to the deboarding location G1 and the initially estimated required time (28 minutes), stored in the RAM, to the deboarding location G1. The control device 10 also calculates the delay time (4 minutes) with respect to the estimated required time to the deboarding location G2 on the basis of the estimated required time calculated as the above (22 minutes) to the deboarding location G2 and the initially estimated required time (26 minutes), stored in the RAM, to the deboarding location G2.

Then, the control device 10 compares the calculated delay time with the acceptable delay time, which is set by the user, to determine whether or not a delay that is not less than the delay acceptable to the user occurs. When the delay time exceeds the acceptable delay time, the control device 10 determines that a delay that is not less than the delay acceptable to the user occurs, while when the delay time is not more than the acceptable delay time, the control device 10 determines that a delay within the user's acceptable range occurs. In the example of FIG. 4A, the control device 10 compares the delay time (22 minutes) with respect to the estimated required time to the deboarding location G1 with the acceptable delay time (15 minutes), which is set by the user A, thereby to determine that a delay that is not less than the delay acceptable to the user occurs. On the other hand, the control device 10 compares the delay time (6 minutes) with respect to the estimated required time to the deboarding location G2 with the acceptable delay time (10 minutes), which is set by the user B, thereby to determine that a delay within the user's acceptable range occurs.

Next, in the ride-sharing management function executed by the control device 10 of the present embodiment, the alternative destination setting function, the second travel route calculation function, and the second required time calculation function will be described with reference to FIGS. 5A and 5B. FIGS. 5A and 5B are a set of diagrams for describing the alternative destination setting function, the second travel route calculation function, and the second required time calculation function. FIG. 5A is a diagram for describing an alternative deboarding location and FIG. 5B is a diagram illustrating transition of the travel route illustrated in FIG. 5A and the estimated required time for the travel route. FIG. 5A illustrates the same scene as the scene of FIG. 4A, and traffic congestion occurs in the section between the intersection "b" and the intersection "h."

The alternative destination setting function will be described. When the delay time with respect to the initially estimated required time exceeds the user's acceptable delay time, the control device 10 uses the alternative destination setting function to set an alternative boarding location for the boarding location or an alternative deboarding location for the deboarding location on the basis of the desired conditions of users who shares a ride. Users who share a ride include the user who is using the shared vehicle Vn and the user who made the use request.

A specific method of setting the alternative boarding location or the alternative deboarding location will be described. The control device 10 of the present embodiment sets the alternative deboarding location to a location that is closest to the initial deboarding location of the user who made the use request and that is on the upstream side of the deboarding location. The control device 10 also sets the alternative boarding location by the same method as the above-described method for the alternative deboarding location. Through this operation, in a state in which a plurality of users shares a ride on the shared vehicle Vn, for example, after the user who made the use request gets off the shared vehicle Vn at the alternative deboarding location, the shared vehicle Vn can travel while avoiding the route on which the traffic congestion occurs. Even when an unpredictable delay occurs, such as due to traffic congestion, the alternative deboarding location can be set during travel of the shared vehicle Vn thereby to allow the delay time to be suppressed within a range of the delay time acceptable to the user who is using the shared vehicle Vn. In the example of FIG. 5A, the control device 10 sets an alternative deboarding location G2' for the deboarding location G2 to an intersection "e" that is located on the upstream side of the deboarding location G2 on the first travel route P1.

The control device 10 of the present embodiment sets the alternative boarding location or the alternative deboarding location for the user who is using the shared vehicle, but the target user for whom the alternative boarding location or the alternative deboarding location is set is not particularly limited. For example, such a target user may be the user who is using the shared vehicle Vn or may also be the user who made the use request. That is, the relationship between the user who gets on the shared vehicle Vn at the alternative boarding location or gets off the shared vehicle Vn at the alternative deboarding location and the order of use of the shared vehicle Vn is not particularly limited.

The second travel route calculation function will be described. The control device 10 uses the second travel route calculation function to calculate a second travel route to the deboarding location, which is set by the user who is using the shared vehicle Vn, via the alternative boarding location or the alternative deboarding location. In the example of FIG. 5A, the control device 10 calculates a second travel route P2 (route composed of "$r_1 \rightarrow r_2 \rightarrow r_9 \rightarrow r_{10} \rightarrow r_{11}$") as the route to the deboarding location G1 via the alternative deboarding location G2'. The second travel route P2 is a travel route to turn to the left in midstream of the routes $r_5$ and $r_6$ on which the traffic congestion occurs. From the timing when determining that the delay time exceeds the acceptable delay time, the shared vehicle V1 travels along the second travel route P2 and can thereby travel to the deboarding location G1 via the routes $r_{10}$ and $r_{11}$ on which traffic congestion does not occur. The route $r_9$ is a route from the intersection "b" to the alternative deboarding location G2', the route $r_{10}$ is a route from the alternative deboarding location G2' to the intersection "g," and the route $r_{11}$ is a route from the intersection "g" to the deboarding location G1.

The control device 10 uses the second required time calculation function to calculate a second required time as the time required for the shared vehicle Vn to arrive at each of the destinations on the second travel route. The destinations on the second travel route refer to the boarding locations or deboarding locations which are set by the users who share a ride on the shared vehicle Vn and the alternative boarding location or the alternative deboarding location which are set using the alternative destination setting function. The users who share a ride on the shared vehicle Vn also include users who will now share a ride on the shared vehicle Vn.

One or more destinations can be considered as those on the second travel route. In the example of FIG. 5A, the second travel route P2 is a travel route from the current position P to the deboarding location G1 via the alternative deboarding location G2'. In this case, the alternative deboarding location G2' and the deboarding location G1 correspond to the destinations on the second travel route P2. The control device 10 calculates the time required for the shared vehicle V1 to arrive at each point on the second travel route P2. Specifically, the control device 10 calculates the estimated required time to the alternative deboarding location G2' as 22 minutes and the estimated required time to the deboarding location G1 as 40 minutes.

Next, in the ride-sharing management function executed by the control device 10 of the present embodiment, the notification function will be described. The control device 10 uses the notification function to notify the user, who is using the shared vehicle Vn, and the user, who made the use request, of the information changed due to the traffic congestion. Specifically, the control device 10 notifies the users of the alternative boarding location or the alternative deboarding location, the second travel route, and the second required time. In the example of FIG. 5A, the control device 10 notifies the user A and the user B of the alternative deboarding location G2', the second travel route P2, the estimated required time (22 minutes) to the alternative deboarding location G2', and the estimated required time (40 minutes) to the deboarding location G1. The user A confirms that the delay time (12 minutes) with respect to the estimated required time to the deboarding location G1 is within the acceptable delay time (15 minutes) even though the traffic congestion occurs. The user A also confirms that the location at which the user B gets off is changed and the travel route after the user gets off is changed. On the other hand, the user B confirms that the deboarding location is changed to the alternative deboarding location G2' located on the upstream side of the deboarding location G2.

The control device 10 may notify the user, who gets off at the alternative deboarding location, of a discounted usage charge. This allows the user notified of the discounted usage charge to treat this as information for determining to accept the deboarding at a location different than the initial deboarding location. The control device 10 can determine the discount ratio in accordance with the distance between the deboarding location and the alternative deboarding location.

When the control device 10 acquires via the communication device 20 the messages that the user who is using the shared vehicle Vn and the user who made the use request accept the content of notification, the control device 10 updates the second travel route as the travel route for the shared vehicle Vn. The control device 10 also updates the second required time as the estimated required time for the shared vehicle Vn to arrive at the destination on the second travel route. Then, the control device 10 uses the communication device 20 to transmit the information indicating that the travel route of the shared vehicle Vn is changed to the second travel route to the control device 230 of the shared vehicle Vn and the user terminal device 400A.

Figure 6:
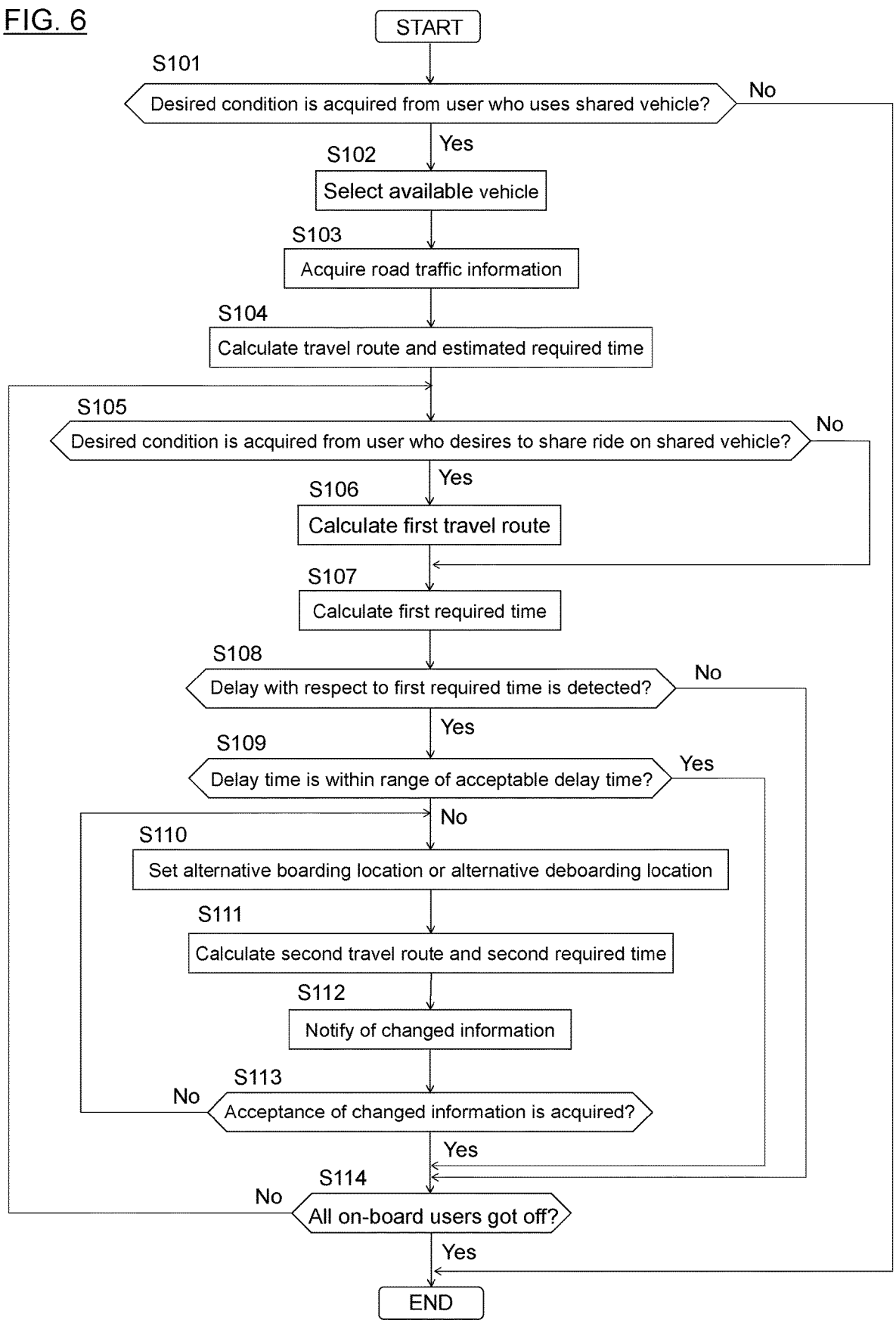
FIG. 6 is a flowchart illustrating the control procedure of a car sharing system executed by the shared vehicle management apparatus of the first embodiment.

With reference to the flow chart of FIG. 6 which is a flowchart illustrating a control procedure of the shared vehicle management system of the present embodiment, the control process of the shared vehicle management system of the present embodiment will be described. The control process is repeatedly executed at predetermined intervals.

In step S101, the control device 10 of the shared vehicle management apparatus 100 determines whether or not the desired condition is acquired from a user who uses the shared vehicle Vn. When the desired condition is acquired, the process proceeds to step S102, while when the desired condition is not acquired, the control process is ended. The desired condition includes the use start time, the departure place, the destination, the information as to whether or not ride-sharing is acceptable, and the acceptable delay time.

In step S102, the control device 10 selects an available shared vehicle that meets the desired condition acquired in step S101.

In step S103, the control device 10 acquires the road traffic information. For example, the control device 10 acquires the road traffic information from the VICS via the communication device 20.

In step S104, the control device 10 calculates the travel route of the shared vehicle Vn and the estimated required time to the deboarding location, which is set by the user, on the basis of the road traffic information acquired in step S103. The control device 10 temporarily stores the estimated required time thus calculated in a RAM as an initially estimated required time (estimated required time before ride-sharing) for the user who is using the shared vehicle Vn. In the example of FIG. 3A, the control device 10 calculates the travel route P0 and the estimated required time (28 minutes) to the deboarding location G1.

In step S105, the control device 10 determines whether or not the desired condition is acquired from a user who desires to share a ride on the shared vehicle Vn. When the desired condition is acquired, the process proceeds to step S106, while when the desired condition is not acquired, the process proceeds to step S107.

In step S106, the control device 10 calculates the first travel route. For example, the control device 10 calculates the first travel route that allows the shared vehicle Vn to arrive in the shortest time at the deboarding location, which is set by the user who is using the shared vehicle Vn, via the boarding location and deboarding location which are set by the user who desires to share a ride. In the example of FIG. 3A, the control device 10 calculates the first travel route P1.

In step S107, the control device 10 calculates the first required time as the estimated required time to the destination on the first travel route. When there is a plurality of boarding locations or a plurality of deboarding locations on the first travel route, the control device 10 calculates the estimated required time to each boarding location or each deboarding location on the first travel route. In the example of FIG. 3A, the control device 10 calculates the estimated required time (40 minutes) to the deboarding location G1 and the estimated required time (20 minutes) to the deboarding location G2.

Then, the control device 10 notifies each user of the first travel route calculated in step S106 and the first required time calculated in step S107. The following description is made on the assumption that each user accepts the notified content. The control device 10 temporarily stores the calculated first required time in a RAM as an initially estimated required time for the user who made the use request in step S105.

In step S108, the control device 10 detects whether or not a delay with respect to the first required time occurs. For example, the control device 10 calculates, at predetermined intervals, the estimated required time to the boarding location or deboarding location set by each user and compares the calculated estimated required time with the initially estimated required time for each user, which is stored in the RAM, to determine whether or not a delay occurs. When a delay occurs, the process proceeds to step S109, while when no delay occurs, the process proceeds to step S114. In the example of FIG. 4A, the control device 10 determines that a delay occurs because, due to the traffic congestion, the estimated required time (26 minutes) to the deboarding location G2 is longer than the initially estimated required time (20 minutes) to the deboarding location G2.

In step S109, the control device 10 determines whether or not the delay occurring in step S108 is within the range of the acceptable delay time. When the delay falls outside the range of the acceptable delay time, the process proceeds to step S110, while when the delay is within the range of the acceptable delay time, the process proceeds to step S114. In the example of FIG. 4A, the control device 10 determines that the delay exceeds the acceptable delay time which is set by the user A.

In step S110, the control device 10 sets the alternative boarding location or the alternative deboarding location. For example, the control device 10 sets the alternative deboarding location to a location that is closest to the deboarding location and that is on the upstream side of the deboarding location on the first travel route. In the example of FIG. 5A, the control device 10 sets the alternative deboarding location G2' to the intersection "b" located on the upstream side of the deboarding location on the first travel route P1.

In step S111, the control device 10 calculates the second travel route for passing through the alternative boarding location or the alternative deboarding location set in step S110. The control device 10 also calculates the second required time as the estimated required time to each of the destinations on the second travel route. In the example of FIG. 5(A), the control device 10 calculates second travel route P2. The control device 10 also calculates the estimated required time (40 minutes) to the deboarding location G1 and the estimated required time (22 minutes) to the deboarding location G2.

In step S112, the control device 10 notifies the user, who is using the shared vehicle, and the user, who made the use request, of the information changed due to the delay. The changed information includes the alternative boarding location or the alternative deboarding location, the second travel route, the second required time, and the discounted usage charge. The users notified of the information confirm the information on the alternative boarding location or the alternative deboarding location, the discounted usage charge, and the travel route and estimated required time which are updated.

In step S113, the control device 10 determines whether or not the messages of accepting the changed information are acquired from the users who are notified of the information in step S112. When the messages of accepting the changed information are acquired, the process proceeds to step S114, while when the messages of accepting the changed information are not acquired, the process returns to step S110.

In step S114, the control device 10 determines whether or not all the users who desired to share a ride have got off the shared vehicle. When all the users who desired to share a ride have got off the shared vehicle, the control process is ended, while when one or more users who desire to share a ride remain, the process returns to step S105.

As described above, the shared vehicle management apparatus 100 of the present embodiment acquires a desired condition including a boarding location or a deboarding location from each of a plurality of users and selects a shared vehicle for the users to share a ride. Then, the shared vehicle management apparatus 100 calculates a first travel route and a first required time for arriving at a destination on the first travel route, on the basis of boarding locations or deboarding locations which are set by users who share a ride on the shared vehicle (the user who is using the shared vehicle Vn and the user who made a use request). When a delay time with respect to the first required time exceeds an acceptable delay time while the shared vehicle Vn is traveling along the first travel route, the shared vehicle management apparatus 100 sets an alternative boarding location for a boarding location or an alternative deboarding location for a deboarding location on the basis of the desired condition of each of the users who share a ride on the shared vehicle. The shared vehicle management apparatus 100 calculates a second travel route for the shared vehicle Vn to travel via the alternative boarding location or the alternative deboarding location and a second required time for the shared vehicle Vn to arrive at a destination on the second travel route. Then, the shared vehicle management apparatus 100 notifies the users, who share a ride on the shared vehicle, of the alternative boarding location or the alternative deboarding location, the second travel route, and the second required time. The user for whom the boarding location is changed can know the time before which the user should arrive at the alternative boarding location, and the user for whom the deboarding location is changed can know the information on the alternative deboarding location. The user who drives the shared vehicle Vn can arrive at the destination within an acceptable time along the second travel route. Through this operation, even when traffic congestion occurs on the travel route while the vehicle is traveling along the travel route to get off a user who shares a ride on the shared vehicle Vn or to pick up a user who will share a ride on the shared vehicle Vn, it is possible to reduce the delay time with respect to the initially estimated required time before the ride-sharing.

Moreover, in the present embodiment, when the delay time with respect to the first required time exceeds the acceptable delay time which is set by the user, the shared vehicle management apparatus 100 sets the alternative boarding location or the alternative deboarding location. The user for whom the alternative boarding location or the alternative deboarding location is set can know that the traffic environment on the route for the shared vehicle Vn to travel has changed. On the other hand, the user for whom the alternative boarding location or the alternative deboarding location is not set can know that the shared vehicle Vn will arrive at the boarding location or the deboarding location at a time within the user's acceptable range, and it is therefore possible to mitigate the anxious feeling to the ride-sharing.

In the above-described embodiment, a configuration is exemplified in which the shared vehicle management apparatus 100 treats the estimated required time before ride-sharing as the initially estimated required time for the user who is using the shared vehicle Vn and treats the first required time as the initial required time for the user who made the use request, but the present invention is not limited to this. For example, the shared vehicle management apparatus 100 can treat the first required time as the initially estimated required time for the user who is using the shared vehicle Vn, by preliminarily subtracting the delay time, which occurs at the time of traveling along the first travel route, from the acceptable delay time which is set by the user who is using the shared vehicle Vn. In the example of FIGS. 3A and 3B, when the user A and the user B transmit messages of accepting the ride-sharing, the shared vehicle management apparatus 100 can treat the initially estimated required time to the deboarding location G1 as 40 minutes by subtracting the delay time (12 minutes) occurring due to the shared vehicle V1 traveling along the first travel route P1 from the acceptable delay time of 15 minutes for the user A.

In the above-described embodiment, the user who gets later on the shared vehicle Vn being used, as the user for whom the alternative boarding location or the alternative deboarding location is set, but the present invention is not limited to this. For example, in the above-described embodiment, the alternative deboarding location may be set for the deboarding location which is set by the user who is using the shared vehicle Vn. In this case, the shared vehicle management apparatus 100 sets the second travel route on which the end point is changed from the deboarding location, which is the end point of the first travel route, to the alternative deboarding location. Through this setting, the user who gets on later can get on and off at the set boarding and deboarding locations even when the traffic environment on the first travel route changes.

Second Embodiment

Next, the shared vehicle management apparatus according to the present invention different than the above-described embodiment will be described. The shared vehicle management apparatus 120 of the present embodiment has the same configuration as that of the shared vehicle management apparatus 100 of the above-described embodiment except that the alternative destination setting function of the control device 10 is different. Accordingly, the description made in the above-described embodiment will be borrowed herein for the same configuration.

The alternative destination setting function of the present embodiment will be described. The control device 10 of the present embodiment uses the alternative destination setting function to set the alternative boarding location or the alternative deboarding location on the basis of the boarding location at which the user who made the use request got on the shared vehicle Vn in past times or the deboarding location at which the user who made the use request got off the shared vehicle Vn in past times.

The control device 10 accesses the user information 34 of the database 30 to acquire information on the usage history of the user who made the use request. The information on the usage history of the user includes information on the boarding location or deboarding location which the user set in past times and/or information on a location at which the user got on or off in past times.

When the information on the usage history of the user of interest is included in the database 30, the control device 10 sets the alternative boarding location or the alternative deboarding location on the basis of the location at which the user got on or got off in past times. This will be described for an example of the alternative deboarding location. For example, when the positional information on the first travel route is included in the information on the usage history of the user, the control device 10 sets the location at which the user got off in past times as a candidate for the alternative deboarding location. Then, the control device 10 determines whether or not the setting of the candidate for the alternative deboarding location allows the delay time to be suppressed within a range of the delay acceptable to the user who uses the shared vehicle Vn. When determining that the delay time can be suppressed within the range of the acceptable delay time, the control device 10 sets the candidate for the alternative deboarding location as the alternative deboarding location. On the other hand, when determining that the delay time cannot be suppressed within the range of the acceptable delay time, the control device 10 sets the alternative deboarding location at another location than the location at which the user got off in past times. A method of setting the alternative deboarding location at another location will be described later. The method of setting the alternative boarding location is the same as the above-described method of setting the alternative deboarding location.

Even in the case in which the positional information on the first travel route is not included in the information on the usage history, when the boarding information around the first travel route is included, the control device 10 sets the location at which the user got on in past times as a candidate for the alternative boarding location. When the deboarding information around the first travel route is included in the information on the usage history, the control device 10 sets the location at which the user got off in past times as a candidate for the alternative deboarding location. This setting method is based on the viewpoint that the anxious feeling given to the user can be mitigated by giving priority to the experience of the user getting on or the experience of the user getting off.

On the other hand, when the information on the usage history of the user of interest is not included in the database 30 or when the information on the usage history of the user of interest is included in the database 30, but the location at which the user got on in past times or the location at which the user got off in past times cannot suppress the delay time within the range of the acceptable delay time, the control device 10 sets the alternative boarding location or the alternative deboarding location on the basis of the road information or weather information. For example, the control device 10 specifies a wide road around the first travel route from the map information 33 of the database 30 and sets the alternative boarding location or the alternative deboarding location on the specified road. In addition or alternatively, when the database 30 stores weather information, the control device 10 specifies a road having a risk of freeze around the first travel route from the weather information and sets the alternative boarding location or the alternative deboarding location on another road than the specified road.

As described above, in the present embodiment, the database 30 stores the information on the usage history as information when the user who shares a ride on the shared vehicle used the shared vehicle Vn in past times. When the information on the usage history includes information on the past boarding location or information on the past deboarding location, the shared vehicle management apparatus 120 sets the alternative boarding location or the alternative deboarding location on the basis of the information on the usage history. Through this operation, the user who gets on the shared vehicle Vn or the user who gets off the shared vehicle Vn can get on or off at a location at which the user got on or off in past times. As a result, even when the boarding or deboarding location is changed, the anxious feeling given to the user can be mitigated.

In the present embodiment, when the information on the usage history does not include information on the past boarding location or information on the past deboarding location, the shared vehicle management apparatus 120 sets the alternative boarding location or the alternative deboarding location on the basis of the road information or weather information. This can prevent the user from getting on or off on a narrow road or on a road with frozen road surface. As a result, the same effect as the above effect is obtained.

Third Embodiment

Next, the shared vehicle management apparatus according to the present invention different than the above-described embodiments will be described. The shared vehicle management apparatus 130 of the present embodiment has the same configuration as that of the shared vehicle management apparatus 100 of the above-described embodiment except that the second travel route calculation function of the control device 10 is different. Accordingly, the description made in the above-described embodiments will be borrowed herein for the same configuration.

The second travel route calculation function of the present embodiment will be described with reference to FIGS. 7A and 7B. FIG. 7 is a set of diagrams for describing the second travel route calculation function of the present embodiment. FIGS. 7A and 7B correspond to FIGS. 5A and 5B, respectively, so the same parts are denoted by the same symbols. In FIG. 7A, traffic congestion occurs in the section between the intersection "b" and the intersection "h." The control device 10 uses the alternative destination setting function to set the alternative deboarding location of the user B to the intersection "e."

When there are two or more routes to the alternative boarding location or the alternative deboarding location, the control device 10 of the present embodiment sets the second travel route so as to arrive at the alternative boarding location or the alternative deboarding location in the shortest time. In the example of FIG. 7A, routes from the current position (intersection "b") of the shared vehicle V1 to the alternative deboarding location G2' (intersection "e") include a straight route $r_9$ (route of the shortest distance from the intersection "b" to the intersection "e") and a detour route composed of "route $r_{12}$→route $r_{13}$→route $r_{14}$." In the example of FIG. 7A, it is assumed that when the shared vehicle V1 travels along the route $r_9$, the estimated required time for arriving at the intersection "e" is 10 minutes or more, while when the shared vehicle V1 travels along the detour route, the estimated required time for arriving at the intersection "e" is 9 minutes. The control device 10 compares the estimated travel times along the two travel routes and selects the detour route with a shorter estimated required time. Then, the control device 10 sets a second travel route P2' including the detour route. This can reduce the estimated required time to the alternative deboarding location G2' and the estimated required time to the deboarding location G1 and, therefore, the anxious feeling given to the user A and the user B can be mitigated.

As described above, when there are two or more routes to the alternative boarding location or the alternative deboarding location, the shared vehicle management apparatus 130 selects the travel route, from among the two or more routes, along which the estimated required time for arriving at the alternative boarding location or the alternative deboarding location is shorter. Then, the shared vehicle management apparatus 130 sets the second travel route including the selected travel route. This allows the shared vehicle Vn to arrive at the alternative boarding location or the alternative deboarding location along the route appropriate for the traffic environment and it is therefore possible to reduce dissatisfaction given to the user for whom the boarding or deboarding location is changed.

Fourth Embodiment

Next, the shared vehicle management apparatus according to the present invention different than the above-described embodiments will be described. The shared vehicle management apparatus 140 of the present embodiment has the same configuration as that of the shared vehicle management apparatus 100 of the above-described embodiment except that the alternative destination setting function of the control device 10 is different. Accordingly, the description made in the above-described embodiments will be borrowed herein for the same configuration. In the present embodiment, the description will be made for a case in which there are two or more users who made use requests.

The alternative destination setting function of the present embodiment will be described with reference to FIGS. 8 to 10. FIGS. 8 to 10 correspond to FIGS. 3 to 5, respectively. FIGS. 8A and 8B are a set of diagrams for describing the first travel route calculation function of the present embodiment. FIGS. 8A and 8B illustrate a scene in which the user B and the user C make use requests for the shared vehicle Vn while the user A is moving to the deboarding location G1 using the shared vehicle V1. In FIGS. 8A and 8B, it is assumed that the user A, the user B, and the user C have accepted to share a ride on the shared vehicle V1. It is also assumed that the user A sets the acceptable delay time to 15 minutes, the user B sets the acceptable delay time to 10 minutes, and the user C sets the acceptable delay time to 10 minutes.

FIGS. 9A and 9B are a set of diagrams for describing the delay time detection function of the present embodiment. FIGS. 9A and 9B illustrate that traffic congestion occurs on the route $r_7$ while the shared vehicle V1 on which the user A, the user B, and the user C share a ride travels along the section between the intersection "b" and the intersection "e." The control device 10 detects that the delay time (18 minutes) with respect to the estimated required time to the deboarding location G1 exceeds the acceptable delay time (15 minutes) of the user A due to the traffic congestion occurring on the route $r_7$.

The control device 10 of the present embodiment finds the cause that the first travel route includes the route on which the traffic congestion occurs. Specifically, the control device 10 finds which user's set boarding location or deboarding location causes the delay time with respect to the estimated required time to exceed the acceptable delay time of a user. In the example of FIG. 9A, the control device 10 finds that the deboarding location G3 set by the user C causes the first travel route P1 to include the route $r_7$ on which the traffic congestion occurs, on the basis of the deboarding locations G1 to G3 included in the first travel route P1, the routes $r_5$, $r_6$, $r_7$, $r_8$ and $r_4$ between respective deboarding locations, and the section from the intersection "h" to the intersection "j" in which the traffic congestion occurs.

FIGS. 10A and 10B are a set of diagrams for describing the alternative destination setting function, the second travel route calculation function, and the second required time calculation function of the present embodiment. FIGS. 10A and 10B illustrate the alternative deboarding location, the second travel route, and the second required time which are set by the control device 10.

The control device 10 of the present embodiment uses the alternative destination setting function to set the alternative boarding location or the alternative deboarding location for the boarding location or the deboarding location, which causes the delay, from among the plurality of boarding locations or the plurality of deboarding locations. Specifically, the control device 10 sets the alternative boarding location or the alternative deboarding location for the boarding location or the deboarding location through which the shared vehicle Vn passes first along the route on which the delay occurs. In the example of FIG. 10A, the control device 10 sets an alternative deboarding location G3' for the deboarding location G3 through which the shared vehicle passes first along the route $r_7$ on which the traffic congestion occurs. Then, the control device 10 calculates the second travel route P2 (route composed of "$r_1 \rightarrow r_2 \rightarrow r_5 \rightarrow r_{15} \rightarrow r_{16} \rightarrow r_{17} \rightarrow r_{18} \rightarrow r_4$") as the route to the deboarding location G1 via the alternative deboarding location G3'. In the example of FIG. 10A, the alternative deboarding location G3' is set to a location on the first travel route P1, but the present invention is not limited to this.

As described above, in the present embodiment, the shared vehicle management apparatus 140 sets the alternative boarding location or the alternative deboarding location for the boarding location or the deboarding location, through which the shared vehicle Vn passes first, on the route which causes the delay. Among the plurality of users who share a ride on the shared vehicle Vn, the user who sets the boarding location or the deboarding location which causes the delay is provided with the alternative boarding location or the alternative deboarding location as the changed boarding location or deboarding location. Through this operation, the user who set the boarding location or the deboarding location unrelated to the cause of delay is prevented from being notified of the alternative boarding location or the alternative deboarding location and it is thus possible to reduce dissatisfaction given to the user.

It should be appreciated that the embodiments explained heretofore are described to facilitate understanding of the present invention and are not described to limit the present invention. It is therefore intended that the elements disclosed in the above embodiments include all design changes and equivalents to fall within the technical scope of the present invention.

For example, in the above-described embodiments, the configuration for setting the alternative deboarding location has been described, but the alternative boarding location may be set. A modified example of the above-described embodiments will be described.

FIGS. 11A and 11B are a set of diagrams for describing the first travel route calculation function of the modified example and the delay time detection function of the modified example. FIG. 11A illustrates a scene in which while the shared vehicle V1 which the user A has got on is traveling toward the boarding location S2 of the user B who made the use request, traffic congestion occurs in the section from the intersection "b" to the intersection "h."

As illustrated in FIG. 11B, the control device 10 detects that the delay time (22 minutes) with respect to the estimated required time to G1 exceeds the acceptable delay time (15 minutes) of the user A due to the occurrence of traffic congestion. In the modified example, the control device 10 calculates the estimated required time to the boarding location S2 and the estimated required time to the deboarding location G2. The method of calculating the estimated required time to the boarding location is the same as the method of calculating the estimated required time to the deboarding location.

FIGS. 12A and 12B are a set of diagrams for describing the alternative destination setting function of the modified example. The control device 10 sets an alternative boarding location S2' for the boarding location S2 to the intersection "e" located on the upstream side of the boarding location S2 on the first travel route P1. Then, the control device 10 calculates the second travel route P2 (route composed of "$r_1 \rightarrow r_2 \rightarrow r_{19} \rightarrow r_{20} \rightarrow r_{21} \rightarrow r_{22} \rightarrow r_{11}$") as the route to the deboarding location G1 via the alternative boarding location S2'. This can suppress the delay time with respect to the estimated required time to the deboarding location G1 within the range of the acceptable delay time of the user A.

In the above-described embodiments, the shared vehicle Vn may be, for example, a vehicle with an automated or autonomous driving function capable of traveling in an automated or autonomous manner without a driver. The shared vehicle Vn is provided with a drive mechanism and a steering mechanism, and these mechanisms are controlled using the automated or autonomous driving function in a fully automated or autonomous manner. In the case of a vehicle with an automated or autonomous driving function, the shared vehicle management apparatus can calculate the estimated required time with a higher degree of accuracy than in the case of a vehicle operated by the user.

In the present description, the shared vehicle management apparatus according to the present invention has been described by exemplifying the shared vehicle management apparatus 100 comprising the control device 10, the communication device 20, and the database 30, but the present invention is not limited to this.

DESCRIPTION OF REFERENCE NUMERALS

1 Shared vehicle management system
  100 Shared vehicle management apparatus
    10 Control device
    20 Communication device
    30 Database
  V1 to Vn Shared vehicle
    200V1 to 200Vn Onboard device
  400A to 400Y User terminal device

The invention claimed is:

1. A shared vehicle management method for managing a shared vehicle using a server and a communication device, the shared vehicle management method comprising:
receiving information of a first desired condition through the communication device, the first desired condition comprising a boarding location, a deboarding location, and an acceptable delay time for a first user;
assigning the first user to the shared vehicle based on the first desired condition;
assigning a second user to the shared vehicle based on the first desired condition and a second desired condition, the second desired condition comprising a boarding location, a deboarding location, and an acceptable delay time for the second user;
calculating a first travel route and a first required time on the basis of the first desired condition and the second desired condition, the first travel route being a route for the shared vehicle to travel, wherein the first required time comprises a first travel time corresponding to the travel time of the first user along the first travel route and a second travel time corresponding to the travel time of the second user along the first travel route when, while the shared vehicle is traveling along the first travel route, the first travel time is delayed beyond the acceptable delay time for the first user or the second travel time is delayed beyond the acceptable delay time for the second user due to a delayed portion of the first travel route, calculating a second travel route and a second required time, and sending information from the communication device to a terminal of the first user and a terminal of the second user of the second travel route;

wherein the second travel route comprises an alternative boarding location or an alternative deboarding location for one or more of the first and second users, wherein the alternative boarding location or the alternative deboarding location for one or more of the first and second users is set on an upstream side of the boarding location or the deboarding location which is set before the shared vehicle is traveling along the first travel route, in the delayed portion of the first travel route so that the delayed portion of the shared vehicle is shortened, wherein the shared vehicle management method comprising sending information on the second travel route to the shared vehicle which causes the shared vehicle equipped with an autonomous driving function to travel along the second travel route.

2. The shared vehicle management method according to claim 1, wherein the second required time comprises a third travel time corresponding to the travel time of the first user along the second travel route and a fourth travel time corresponding to the travel time of the second user along the second travel route.

3. The shared vehicle management method according to claim 2, wherein the third travel time is not delayed beyond the acceptable delay time of the first user and the fourth travel time is not delayed beyond the acceptable delay time of the second user.

4. The shared vehicle management method according to claim 1, wherein the first user is a user who boards the shared vehicle earlier than the second user.

5. A shared vehicle management apparatus comprising a control device configured to manage a shared vehicle on a basis of information on the shared vehicle stored in a server and a communication device, the shared vehicle being shared by a plurality of users, the control device being further configured to:

receive information of a first desired condition through the communication device, the first desired condition comprising a boarding location, a deboarding location, and an acceptable delay time for a first user;

assign the first user to the shared vehicle based on the first desired condition;

assign a second user to the shared vehicle based on the first desired condition and a second desired condition, the second desired condition comprising a boarding location, a deboarding location, and an acceptable delay time for the second user;

calculate a first travel route and a first required time on the basis of the first desired condition and the second desired condition, the first travel route being a route for the selected vehicle to travel, the first required time comprising a first travel time corresponding to the travel time of the first user along the first travel route and a second travel time corresponding to the travel time of the second user along the first travel route;

when, while the shared vehicle is traveling along the first travel route, the first travel time is delayed beyond the acceptable delay time for the first user or the second travel time is delayed beyond the acceptable delay time for the second user due to a delayed portion of the first travel route, calculate a second travel route and a second required time, and send information from the communication device to a terminal of the first user and a terminal of the second user of the second travel route;

wherein the second travel route comprises an alternative boarding location or an alternative deboarding location for one or more of the first and second users, wherein the alternative boarding location or the alternative deboarding location for one or more of the first and second users is set on an upstream side of the boarding location or the deboarding location which is set before the shared vehicle is traveling along the first travel route, in the delayed portion of the first travel route so that the delayed portion of the shared vehicle is shortened, wherein the control device being further configured to send information on the second travel route to the shared vehicle which causes the shared vehicle equipped with an autonomous driving function to travel along the second travel route.

6. The shared vehicle management apparatus according to claim 5, wherein the second required time comprises a third travel time corresponding to the travel time of the first user along the second travel route and a fourth travel time corresponding to the travel time of the second user along the second travel route.

7. The shared vehicle management apparatus according to claim 6, wherein the third travel time is not delayed beyond the acceptable delay time of the first user and the fourth travel time is not delayed beyond the acceptable delay time of the second user.

8. The shared vehicle management apparatus according to claim 5, wherein the first user is a user who boards the shared vehicle earlier than the second user.

* * * * *